(12) United States Patent
Tomanec et al.

(10) Patent No.: US 10,941,700 B2
(45) Date of Patent: Mar. 9, 2021

(54) TURBOCHARGER TURBINE WASTEGATE ASSEMBLY

(71) Applicant: Garrett Transportation I Inc., Torrance, CA (US)

(72) Inventors: Filip Tomanec, Luhacovice (CZ); Antonin Forbelsky, Brno (CZ)

(73) Assignee: Garrett Transportation I Inc., Torrance, CA (US)

( * ) Notice: Subject to any disclaimer, the term of this patent is extended or adjusted under 35 U.S.C. 154(b) by 71 days.

(21) Appl. No.: 16/298,690

(22) Filed: Mar. 11, 2019

(65) Prior Publication Data

US 2020/0291849 A1  Sep. 17, 2020

(51) Int. Cl.
F02B 37/18 (2006.01)
F01D 17/10 (2006.01)
F16H 21/44 (2006.01)

(52) U.S. Cl.
CPC .......... F02B 37/186 (2013.01); F01D 17/105 (2013.01); F16H 21/44 (2013.01)

(58) Field of Classification Search
CPC ....... F02B 37/186; F01D 17/105; F16H 21/44
See application file for complete search history.

(56) References Cited

U.S. PATENT DOCUMENTS

| | | |
|---|---|---|
| 4,506,246 A | 3/1985 | Wong |
| 4,508,239 A | 4/1985 | Rozzen |
| 5,146,753 A | 9/1992 | Potter |
| 5,929,405 A | 7/1999 | Wehrli, III et al. |
| 6,250,564 B1 | 6/2001 | Chahley |
| 2003/0196435 A1* | 10/2003 | Heath .................... F02B 37/186 60/602 |
| 2003/0196453 A1 | 10/2003 | Heath |
| 2007/0271917 A1* | 11/2007 | Vogt .................... F16K 31/5282 60/600 |
| 2011/0005222 A1 | 1/2011 | Hayashi et al. |
| 2012/0060494 A1* | 3/2012 | Sato ...................... F02B 37/183 60/602 |

FOREIGN PATENT DOCUMENTS

| | | |
|---|---|---|
| DE | 10 2008 032 927 A1 | 1/2010 |
| DE | 10 2013 011 106 A1 | 1/2015 |
| EP | 2 251 533 B1 | 4/2015 |

OTHER PUBLICATIONS

EPO Extended European Search Report (EESR), Application No. 20153332.0-1004, dated Mar. 16, 2020 (6 pages).

* cited by examiner

*Primary Examiner* — Audrey K Bradley
*Assistant Examiner* — Edward Bushard
(74) *Attorney, Agent, or Firm* — Brian J. Pangrle

(57) ABSTRACT

A turbocharger turbine wastegate assembly can include a lever that includes an opening and two arms, where each of the two arms extends a respective length from the opening; and a crank that includes a wastegate shaft coupling, where the lever and crank are operatively coupled via one of the arms by a pin received in a channel.

15 Claims, 24 Drawing Sheets

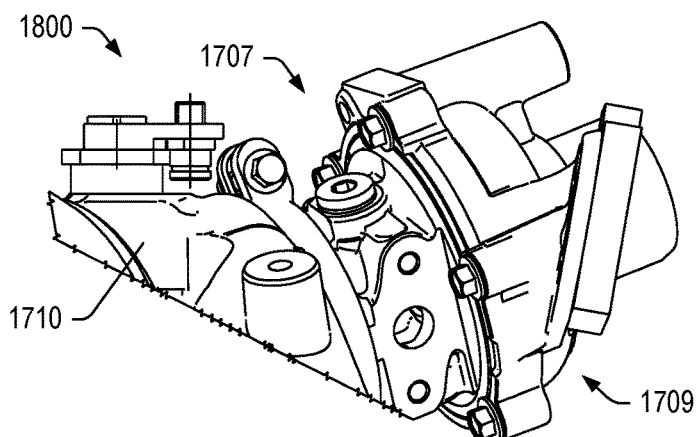
Fig. 20A
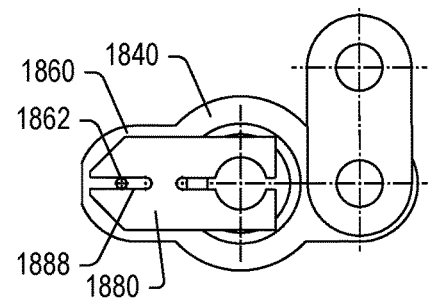
Fig. 20D
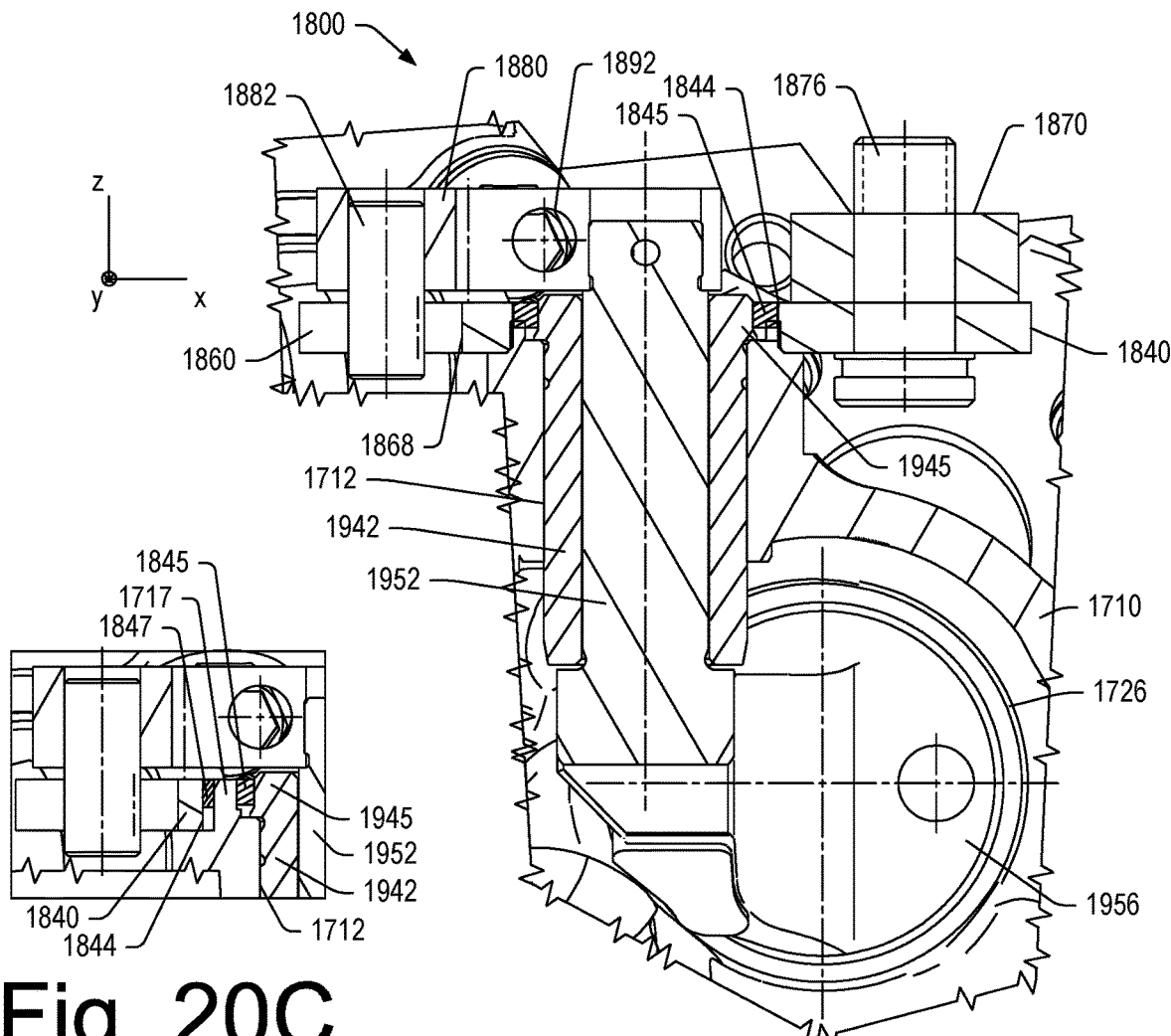
Fig. 20C
Fig. 20B

US 10,941,700 B2

TURBOCHARGER TURBINE WASTEGATE ASSEMBLY

TECHNICAL FIELD

Subject matter disclosed herein relates generally to turbomachinery for internal combustion engines and, in particular, to turbine wastegate assemblies.

BACKGROUND

A turbine wastegate, or simply a "wastegate", is typically a valve that can be controlled to selectively allow at least some exhaust to bypass a turbine. Where an exhaust turbine drives a compressor for boosting inlet pressure to an internal combustion engine (e.g., as in a turbocharger), a wastegate provides a means to control the boost pressure.

A so-called internal wastegate is integrated at least partially into a turbine housing. An internal wastegate typically includes a flapper valve (e.g., a plug), a crank arm, a shaft or rod, and an actuator. A plug of a wastegate often includes a flat disk shaped surface that seats against a flat seat (e.g., a valve seat or wastegate seat) disposed about an exhaust bypass opening, though various plugs may include a protruding portion that extends into an exhaust bypass opening (e.g., past a plane of a wastegate seat).

In a closed position, a wastegate plug should be seated against a wastegate seat (e.g., seating surface) with sufficient force to effectively seal an exhaust bypass opening (e.g., to prevent leaking of exhaust from a high pressure exhaust supply to a lower pressure region). Often, an internal wastegate is configured to transmit force from an arm to a plug (e.g., as two separate, yet connected components). During engine operation, load requirements for a wastegate vary with pressure differential. High load requirements can generate high mechanical stresses in a wastegate's kinematics components, a fact which has led in some instances to significantly oversized component design to meet reliability levels (e.g., as demanded by engine manufacturers). Reliability of wastegate components for gasoline engine applications is particularly important where operational temperatures and exhaust pulsation levels can be quite high.

Various examples of wastegates, wastegate assemblies, wastegate components and wastegate related processes are described herein.

BRIEF DESCRIPTION OF THE DRAWINGS

A more complete understanding of the various methods, devices, assemblies, systems, arrangements, etc., described herein, and equivalents thereof, may be had by reference to the following detailed description when taken in conjunction with examples shown in the accompanying drawings where:

FIG. 2B shows a cross-sectional view along a line A-A;

FIGS. 20A, 20B, 20C and 20D show a perspective view, a cut-away view, a cut-away view of an alternative arrangement, and a plan view of an alternative arrangement of an example assembly, respectively;

DETAILED DESCRIPTION

Figure 1A:
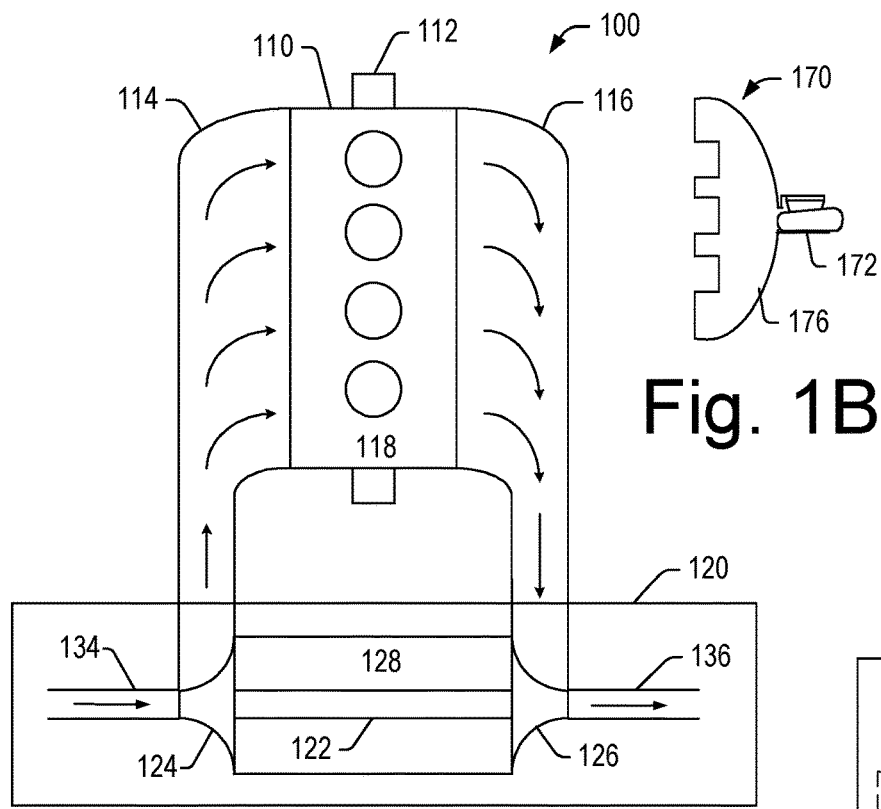
FIGS. 1A, 1B, 1C, 1D and 1E are diagrams of a turbocharger and an internal combustion engine along with a controller and an example of a vehicle.

Turbochargers are frequently utilized to increase output of an internal combustion engine. Referring to FIGS. 1A-E, as an example, a system 100 can include an internal combustion engine 110 and a turbocharger 120. As shown in FIG. 1D, the system 100 may be part of a vehicle 101 where the system 100 is disposed in an engine compartment and connected to an exhaust conduit 103 that directs exhaust to an exhaust outlet 109, for example, located behind a passenger compartment 105. In the example of FIG. 1D, a treatment unit 107 may be provided to treat exhaust (e.g., to reduce emissions via catalytic conversion of molecules, etc.).

As shown in FIG. 1A, the internal combustion engine 110 includes an engine block 118 housing one or more combustion chambers that operatively drive a shaft 112 (e.g., via pistons) as well as an intake port 114 that provides a flow path for air to the engine block 118 and an exhaust port 116 that provides a flow path for exhaust from the engine block 118.

The turbocharger 120 can act to extract energy from the exhaust and to provide energy to intake air, which may be combined with fuel to form combustion gas. As shown in FIG. 1E, the turbocharger 120 includes an air inlet 134, a shaft 122, a compressor housing assembly 124 for a compressor wheel 125, a turbine housing assembly 126 for a turbine wheel 127, another housing assembly 128 and an exhaust outlet 136. The housing 128 may be referred to as a center housing assembly as it is disposed between the compressor housing assembly 124 and the turbine housing assembly 126. The shaft 122 may be a shaft assembly that includes a variety of components. The shaft 122 may be rotatably supported by a bearing system (e.g., journal bearing(s), rolling element bearing(s), etc.) disposed in the housing assembly 128 (e.g., in a bore defined by one or more bore walls) such that rotation of the turbine wheel 127 causes rotation of the compressor wheel 125 (e.g., as rotatably coupled by the shaft 122). As an example a center housing rotating assembly (CHRA) can include the compressor wheel 125, the turbine wheel 127, the shaft 122, the housing assembly 128 and various other components (e.g., a compressor side plate disposed at an axial location between the compressor wheel 125 and the housing assembly 128).

In the example of FIG. 1E, a variable geometry assembly 129 is shown as being, in part, disposed between the housing assembly 128 and the housing assembly 126. Such a variable geometry assembly may include vanes or other components to vary geometry of passages that lead to a turbine wheel space in the turbine housing assembly 126. As an example, a variable geometry compressor assembly may be provided.

In the example of FIG. 1E, a wastegate valve (or simply wastegate) 135 is positioned proximate to an exhaust inlet of the turbine housing assembly 126. The wastegate valve 135 can be controlled to allow at least some exhaust from the exhaust port 116 to bypass the turbine wheel 127. Various wastegates, wastegate components, etc., may be applied to a conventional fixed nozzle turbine, a fixed-vaned nozzle turbine, a variable nozzle turbine, a twin scroll turbocharger, etc.

In the example of FIG. 1E, an exhaust gas recirculation (EGR) conduit 115 is also shown, which may be provided, optionally with one or more valves 117, for example, to allow exhaust to flow to a position upstream the compressor wheel 125.

Figure 1B:
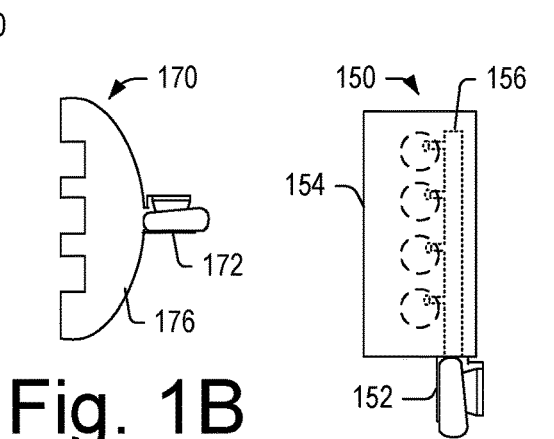
Figure 1C:
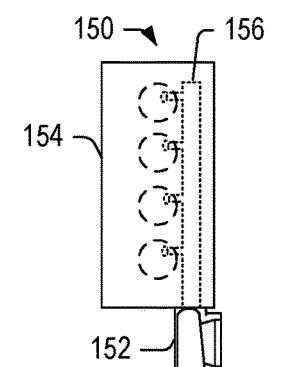
Figure 1D:
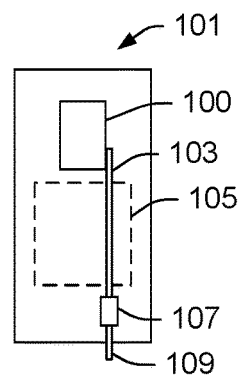
Figure 1E:
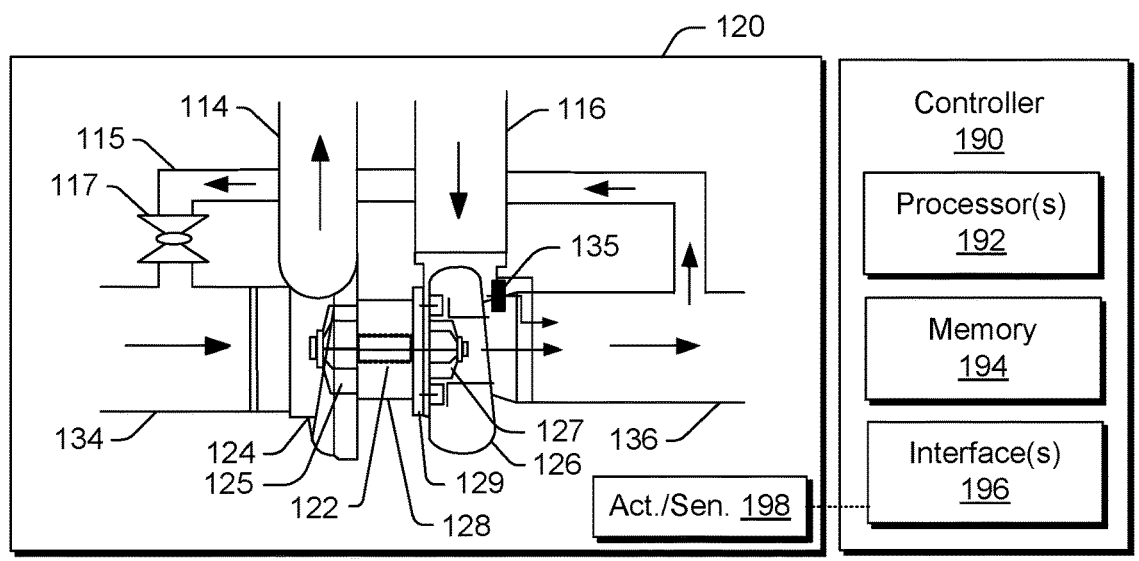

FIGS. 1B and 1C show an example arrangement 150 for flow of exhaust to an exhaust turbine housing assembly 152 (FIG. 1B) and another example arrangement 170 for flow of exhaust to an exhaust turbine housing assembly 172 (FIG. 1C). In the arrangement 150, a cylinder head 154 includes passages 156 within to direct exhaust from cylinders to the turbine housing assembly 152 while in the arrangement 170, a manifold 176 provides for mounting of the turbine housing assembly 172, for example, without any separate, intermediate length of exhaust piping. In the example arrangements 150 and 170, the turbine housing assemblies 152 and 172 may be configured for use with a wastegate, variable geometry assembly, etc.

In FIG. 1E, an example of a controller 190 is shown as including one or more processors 192, memory 194 and one or more interfaces 196. Such a controller may include circuitry such as circuitry of an engine control unit (ECU). As described herein, various methods or techniques may optionally be implemented in conjunction with a controller, for example, through control logic. Control logic may depend on one or more engine operating conditions (e.g., turbo rpm, engine rpm, temperature, load, lubricant, cooling, etc.). For example, sensors may transmit information to the controller 190 via the one or more interfaces 196. Control logic may rely on such information and, in turn, the controller 190 may output control signals to control engine operation. The controller 190 may be configured to control lubricant flow, temperature, a variable geometry assembly (e.g., variable geometry compressor or turbine), a wastegate (e.g., via an actuator), an electric motor, or one or more other components associated with an engine, a turbocharger (or turbochargers), etc. As an example, the turbocharger 120 may include one or more actuators and/or one or more sensors 198 that may be, for example, coupled to an interface or interfaces 196 of the controller 190. As an example, the wastegate 135 may be controlled by a controller that includes an actuator responsive to an electrical signal, a pressure signal, etc. As an example, an actuator for a wastegate may be a mechanical actuator, for example, that may operate without a need for electrical power (e.g., consider a mechanical actuator configured to respond to a pressure signal supplied via a conduit). As an example, an actuator for a wastegate may be an electrical actuator (e.g., consider an electro-mechanical actuator).

Figure 2A:
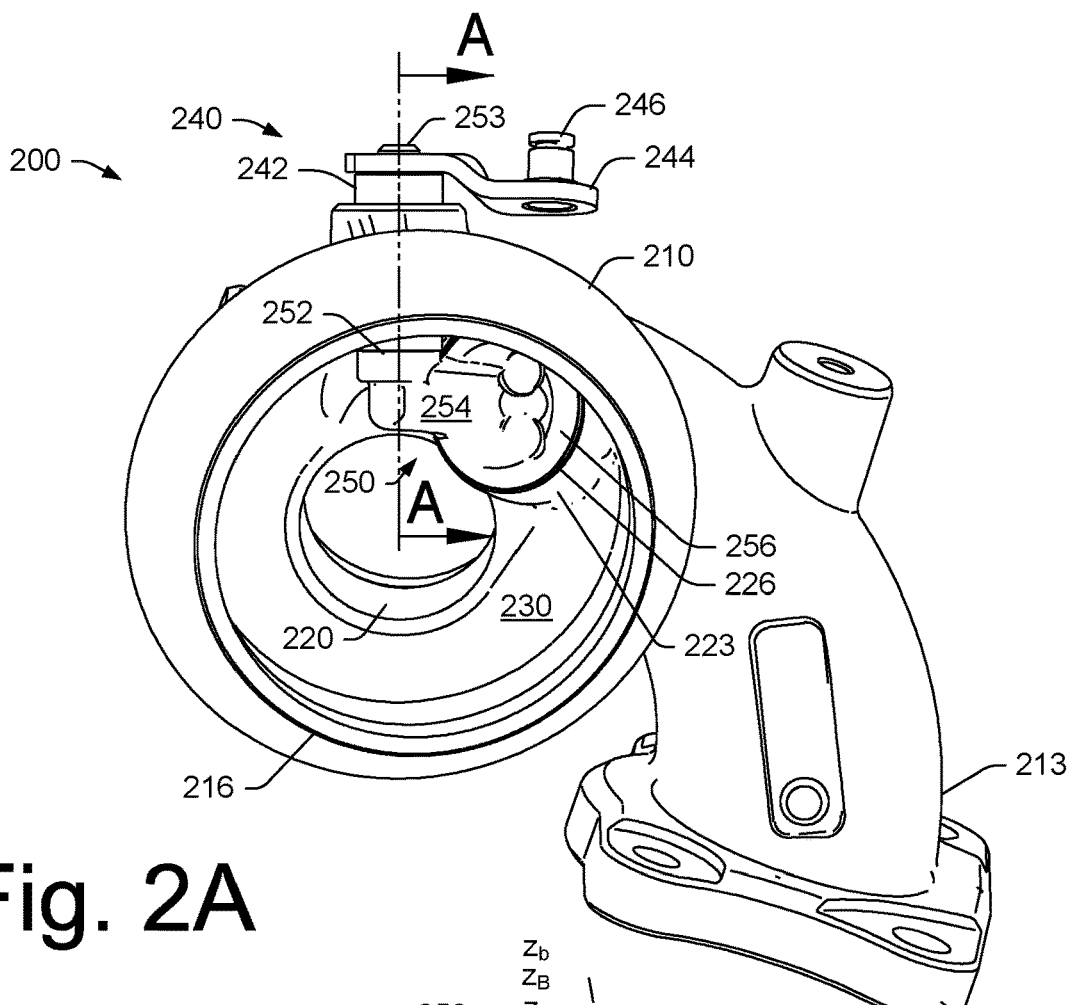
FIGS. 2A and 2B are views of an example of an assembly that includes a wastegate where
Figure 2B:
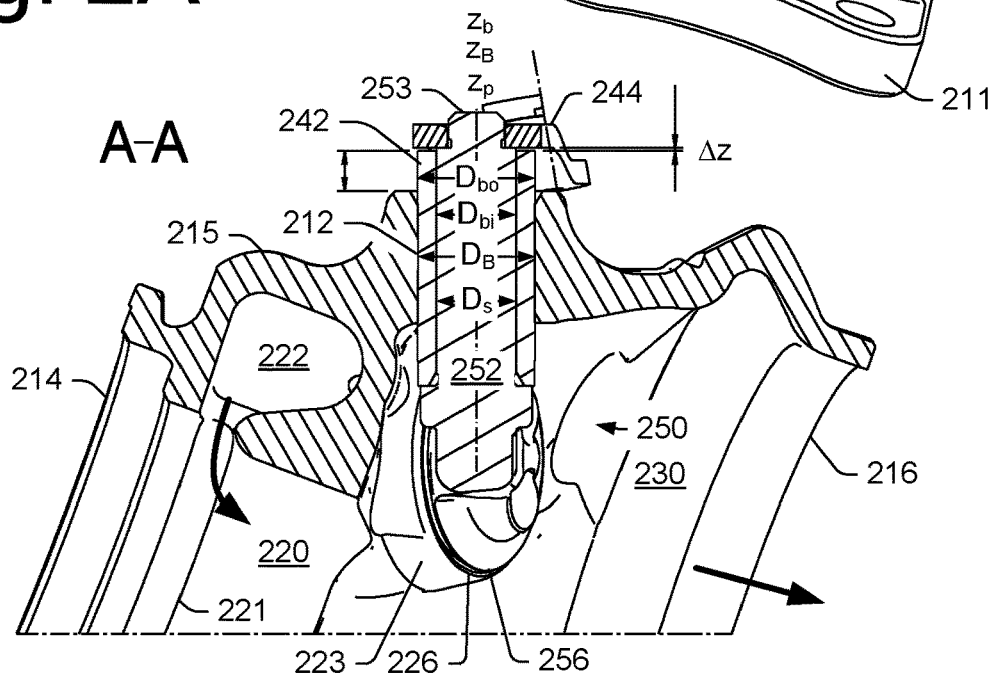

FIGS. 2A and 2B show an example of an assembly 200 that includes a turbine housing 210 that includes a flange 211, a bore 212, an inlet conduit 213, a turbine wheel opening 214, a spiral wall 215, an exhaust outlet opening 216, a shroud wall 220, a nozzle 221, a volute 222 formed in part by the spiral wall 215, a wastegate wall 223 that extends to a wastegate seat 226, and an exhaust chamber 230. In the example of FIGS. 2A and 2B, the turbine housing 210 may be a single piece or multi-piece housing. As an example, the turbine housing 210 may be a cast component (e.g., formed via a sand casting or another casting process). The turbine housing 210 includes various walls, which can define features such as the bore 212, the turbine wheel opening 214, the exhaust outlet opening 216, the chamber 230, etc. In particular, the wastegate wall 223 defines a wastegate passage in fluid communication with the inlet conduit 213 where a wastegate control linkage 240 and a wastegate arm and plug 250 are configured for opening and closing the wastegate passage (e.g., for wastegating exhaust).

In the example of FIGS. 2A and 2B, the wastegate control linkage 240 includes a bushing 242 configured for receipt by the bore 212 of the turbine housing 210, a control arm 244 and a peg 246 and the wastegate arm and plug 250 includes a shaft 252, a shaft end 253, an arm 254 and a plug 256. As shown, the bushing 242 is disposed between the bore 212 and the shaft 252, for example, to support rotation of the shaft 252, to seal the chamber 230 from an exterior space, etc. The bore 212, the bushing 242 and the shaft 252 may each be defined by a diameter or diameters as well as one or more lengths. For example, the shaft 252 includes a diameter $D_s$, the bore 212 includes a diameter $D_B$ while the bushing 242 includes an inner diameter $D_{bi}$ and an outer diameter $D_{bo}$. In the example of FIGS. 2A and 2B, when the various components are assembled, the diameters may be as follows: $D_B > D_{bo} > D_{bi} > D_s$. As to lengths, a length of the shaft 252 exceeds a length of the bushing 242, which exceeds a length of the bore 212. Such lengths may be defined with respect to a shaft axis $z_s$, a bushing axis $z_b$ and a bore axis $z_B$. As shown, the bushing 242 is disposed axially between a shoulder of the shaft 252 and the control arm 244 of the control linkage 240.

In the example of FIG. 2B, a gap $\Delta z$ is shown between a surface of the bushing 242 and a surface of the control arm 244, which allows for axial movement of the shaft 252, for example, to facilitate self-centering of the plug 256 with respect to the wastegate seat 226.

As an example, the assembly 200 may be fitted to an exhaust conduit or other component of an internal combustion engine (see, e.g., examples of FIG. 1A-E) via the flange 211 such that exhaust is received via the inlet conduit 213, directed to the volute 222. From the volute 222, exhaust is directed via the nozzle 221 to a turbine wheel disposed in the turbine housing 210 via the opening 214 to flow and expand in a turbine wheel space defined in part by the shroud wall 220. Exhaust can then exit the turbine wheel space by flowing to the chamber 230 and then out of the turbine housing 210 via the exhaust outlet opening 216.

As to wastegating, upon actuation of the control linkage 240 (e.g., by an actuator coupled to the peg 246), the wastegate arm and plug 250 may be rotated such that at least a portion of the received exhaust can flow in the wastegate passage defined by the wastegate wall 223, past the wastegate seat 226 and into the chamber 230, rather than through the nozzle 221 to the turbine wheel space. The wastegated portion of the exhaust may then exit the turbine housing 210 via the exhaust outlet opening 216 (e.g., and pass to an exhaust system of a vehicle, be recirculated in part, etc.).

As an example, the control linkage 240 may exert a force that acts to force the plug 256 in a direction toward the wastegate seat 226. For example, an actuator may include a biasing mechanism (e.g., a spring, etc.) that exerts force, which may be controllably overcome, at least in part, for rotating the plug 256 away from the wastegate seat 226 (e.g., for wastegating). As an example, an actuator may be mounted to a turbocharger (e.g., mounted to a compressor assembly, etc.). As an example, an actuator may be a linear actuator, for example, that includes a rod that moves along an axis. Depending on orientation of a plug, a shaft, a control linkage and such a rod, to maintain the plug in a closed position, the rod may exert a downward force (e.g., away from the control linkage as in the example of FIGS. 2A and 2B) or the rod may exert an upward force (e.g., toward the control linkage). For example, where the control arm 244 (e.g., and the peg 246) of the control linkage 240 are oriented on the same "side" as the plug 256 with respect to the shaft 252, a downward force applied to the control arm 244 (e.g., via the peg 246) may act to maintain the plug 256 in a closed position with respect to the wastegate seat 226; whereas, where, for example, an approximately 180 degree span exists between a plug and a control arm, an upward force applied to the control arm may act to maintain the plug in a closed position with respect to a wastegate seat.

As an example, a rod of an actuator may be biased to exert a force on a control linkage that causes the control linkage to exert a force on a plug (see, e.g., the plug 256) such that the plug seats against a wastegate seat (see, e.g., the wastegate seat 226). In such an example, the actuator may at least in part overcome the force that biases the rod such that a shaft rotates the plug away from the wastegate seat. For example, in FIGS. 2A and 2B, to initiate wastegating, the entire plug 256 rotates about an axis of the shaft 252 and moves away from the wastegate seat 226 (e.g., without any portion of the plug 256 moving into a wastegate opening defined by the wastegate seat 226). As an example, the moving away of the plug 256 may be facilitated by exhaust pressure. For example, in a closed position, the plug 256 experiences a pressure differential where pressure is higher below the plug 256 and less above the plug 256. In such an example, the pressure below the plug 256 acts in a direction that is countered by the closing force applied to the plug 256 via the control linkage 240 (e.g., the pressure differential acts to bias the plug 256 toward an open position). Accordingly, the closing force applied to the plug 256 should overcome pressure force from below the plug 256. Further, where the shaft 252 may include some play (see, e.g., Δz, etc.), the closing force applied to the plug 256 may cause the plug 256 to self-center with respect to the wastegate seat 226 (e.g., to facilitate sealing, to avoid exhaust leakage, etc.).

In the example of FIG. 2B, the axes of the bore 212, the bushing 242 and the shaft 252 are shown as being aligned (e.g., defining a common axis), however, during assembly, operation, etc., some misalignment may occur. For example, over time, clearances between the various components (e.g., plug, arm, shaft, bore, bushing, etc.) can change. Forces that can cause such change include aerodynamic excitation, high temperatures, temperature cycling (e.g., temperatures <−20 degrees C. to >1000 degrees C.), chemical attack, friction, deterioration of materials, etc. For at least the foregoing reasons, it can be difficult to maintain effective sealing of a wastegate opening over the lifetime of an exhaust turbine assembly. As to temperature, problems at high temperatures generally include wear and loss of function and consequently leakage, lack of controllability or a combination of leakage and uncontrollability.

As an example, a plug may include a contact portion and an aerodynamic portion. For example, a plug may include a radiused portion as a contact portion that contacts a surface of a wastegate seat in a closed state and an aerodynamic portion that defines a flow passage with respect to the surface of the wastegate seat in an open state. In such an example, the aerodynamic portion may extend into a wastegate passage in the closed state (e.g., without contacting a surface that defines the wastegate passage, a surface of the wastegate seat, etc.). As an example, in an assembly, such a plug may be configured to self-center with respect to a wastegate seat (e.g., in a closed state). As an example, a surface of a wastegate seat may be conical, which may facilitate self-centering of a contact portion of a plug. As an example, one or more clearances may exist in an assembly for a wastegate shaft with respect to a bushing such that the wastegate shaft may move in a manner that allows for self-centering of a wastegate plug, operatively coupled to the wastegate shaft, with respect to a wastegate seat.

Figure 3:
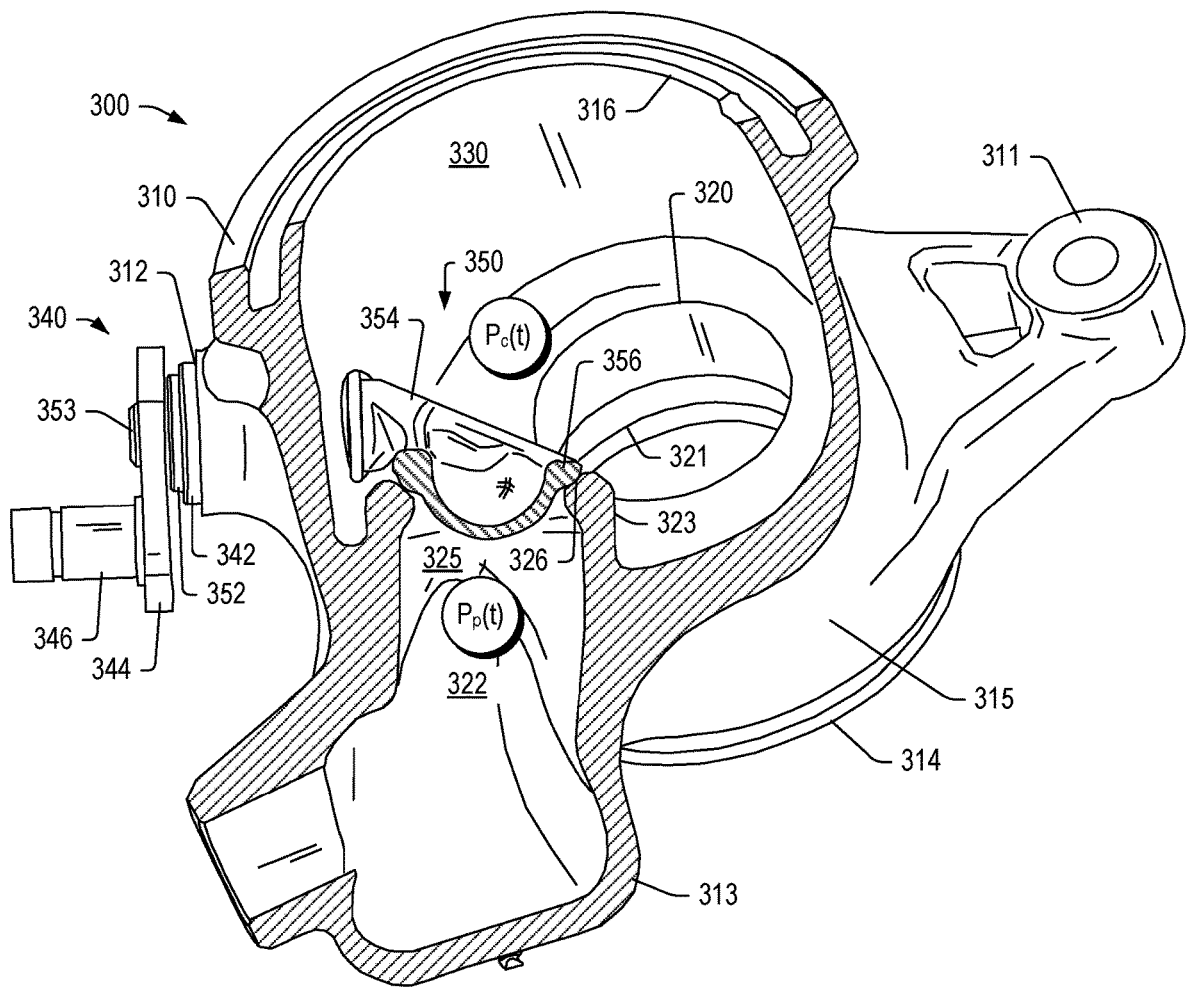
FIG. 3 is a view of an example of an assembly that includes a wastegate along with a plot of pressures with respect to time.
Figure 3:
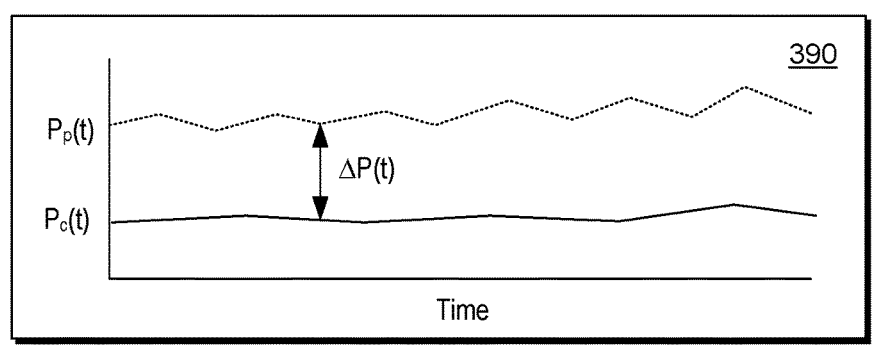

FIG. 3 shows an example of an assembly 300 that includes a wastegate arm and plug 350 that differs from the wastegate arm and plug 250 of the assembly 200 of FIGS. 2A and 2B. In particular, the wastegate arm and plug 350 includes a plug 356 that includes a substantially hemispherical shell portion 357.

In the example of FIG. 3 the assembly 300 includes a turbine housing 310 that includes a mounting flange 311, a bore 312, an inlet conduit 313, a turbine wheel opening 314, a spiral wall 315, an exhaust outlet opening 316, a shroud wall 320, a nozzle 321, a volute 322 formed in part by the spiral wall 315, a wastegate wall 323 that defines (e.g., at least in part) a wastegate passage 325 where the wastegate wall 323 extends to a wastegate seat 326 that may be an interface between the wastegate passage 325 and an exhaust chamber 330.

In the example of FIG. 3, the turbine housing 310 may be a single piece or multi-piece housing. As an example, the turbine housing 310 may be a cast component (e.g., formed via sand casting or other casting process). The turbine housing 310 includes various walls, which can define features such as the bore 312, the turbine wheel opening 314, the exhaust outlet opening 316, the chamber 330, etc. In particular, the wastegate wall 323 defines at least in part the wastegate passage 325, which is in fluid communication with the inlet conduit 313 where a wastegate control linkage 340 and the wastegate arm and plug 350 are configured for opening and closing the wastegate passage (e.g., for wastegating exhaust).

As an example, the assembly 300 may be fitted to an exhaust conduit or other component of an internal combustion engine (see, e.g., examples of FIG. 1A-E), for example, via a flange (see, e.g., the flange 211 of FIG. 2A) such that exhaust is received via the inlet conduit 313, directed to the volute 322. From the volute 322, exhaust is directed via the nozzle 321 to a turbine wheel disposed in the turbine housing 310 via the opening 314 to flow and expand in a turbine wheel space defined in part by the shroud wall 320. Exhaust can then exit the turbine wheel space by flowing to the chamber 330 and then out of the turbine housing 310 via the exhaust outlet opening 316. As to wastegating, upon actuation of the control linkage 340 (e.g., by an actuator coupled to the peg 346), the wastegate arm and plug 350 may be rotated such that at least a portion of the received exhaust can flow in the wastegate passage 325 (e.g., as defined at least in part by the wastegate wall 323), past the wastegate seat 326 and into the chamber 330, rather than through the nozzle 321 to the turbine wheel space. The wastegated portion of the exhaust may then exit the turbine housing 310 via the exhaust outlet opening 316 (e.g., and pass to an exhaust system of a vehicle, be recirculated in part, etc.).

In the example of FIG. 3, the wastegate control linkage 340 includes a bushing 342 configured for receipt by the bore 312 of the turbine housing 310, a control arm 344 and a peg 346 and the wastegate arm and plug 350 includes a shaft 352, a shaft end 353, an arm 354 and the plug 356.

FIG. 3 also shows a plot 390 of approximate pressure values versus time for a passage pressure $P_p$ of the wastegate passage 325 and a chamber pressure $P_c$ of the chamber 330. As shown, when the plug 356 is in a closed orientation with respect to the wastegate seat 326, a pressure differential can exist between the wastegate passage 325 and the chamber 330, which is shown as $\Delta P(t)$. The pressure differential is applied to the plug 356, particularly the portion of the plug 356 that is exposed to exhaust gas in the wastegate passage 325.

The plug 356 can be transitioned from a closed orientation (e.g., closed state) to an open orientation (e.g., open state), for example, responsive to a manifold pressure of an intake manifold of an internal combustion engine operatively coupled to a turbocharger (or turbochargers). As an example, a controller can be operatively coupled to an actuator where the controller receives a signal that can correspond to a manifold pressure (e.g., directly or indirectly) where the controller can actuate the actuator when the manifold pressure exceeds a set point value to transition the plug 356 from a closed orientation to an open orientation (e.g., closed state to open state) to thereby allow exhaust gas to bypass a turbocharger turbine wheel, which, in turn, can reduce charge air pressure delivered by a turbocharger compressor wheel. Such an actuator may be electric, mechanical, pneumatic, etc. A transition may be achieved by an actuator rotating an element, translating an element, etc. Such rotation may be clockwise or counter-clockwise and such translation may be inwardly toward the actuator or outwardly away from the actuator.

Figure 4A:
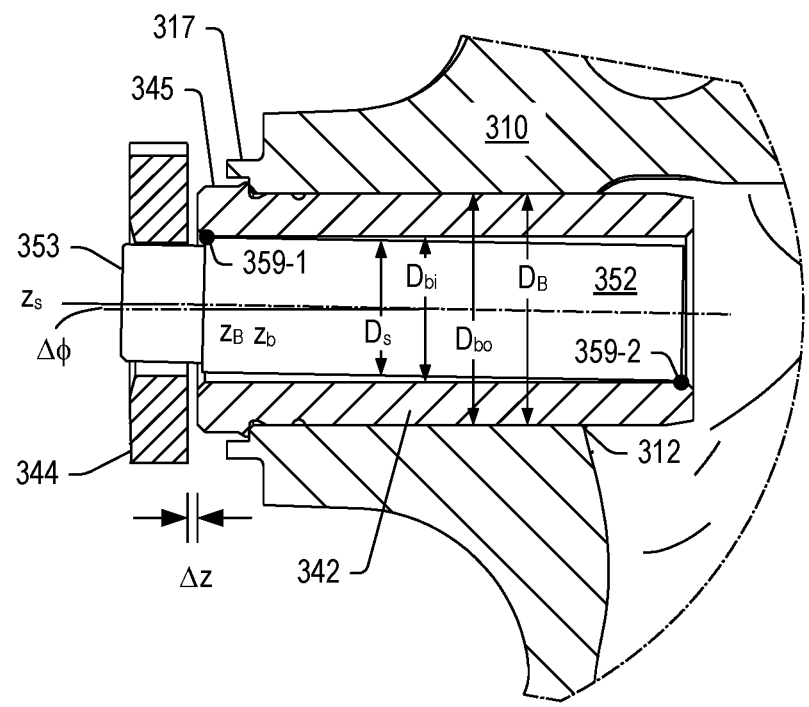
FIGS. 4A and 4B are cross-sectional views of examples of assemblies with shaft tilt and with shaft line contact with respect to a bore of a bushing.
Figure 4B:
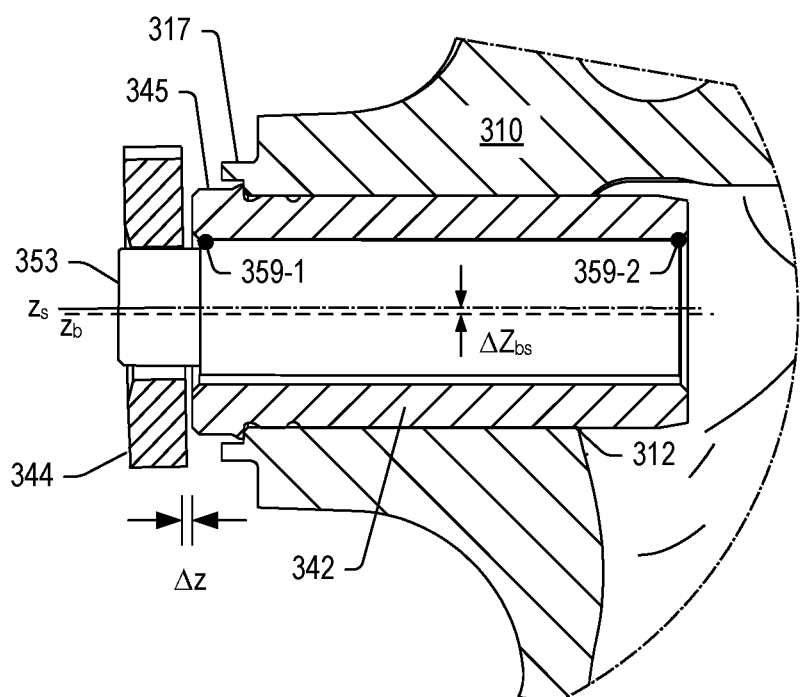

As shown in FIGS. 4A and 4B, cross-sectional views are shown where the bushing 342 is seen as being disposed between the bore 312 and the shaft 352, for example, to support rotation of the shaft 352, to seal the chamber 330 from an exterior space, etc. (e.g., air space). The bore 312, the bushing 342 and the shaft 352 may each be defined by a diameter or diameters as well as one or more lengths. For example, the shaft 352 includes a diameter $D_s$, the bore 312 includes a diameter $D_B$ while the bushing 342 includes an inner diameter $D_{bi}$ and an outer diameter $D_{bo}$. In the examples of FIGS. 4A and 4B, when the various components are assembled, the diameters may be as follows: $D_B > D_{bo} > D_{bi} > D_s$. As to lengths, a length of the shaft 352 exceeds a length of the bushing 342, which exceeds a length of the bore 312. Such lengths may be defined with respect to a shaft axis $z_s$, a bushing axis $z_b$ and a bore axis $z_B$.

In the views of FIGS. 4A and 4B, the shaft 352 is shown as including an axis $z_s$ that may become misaligned with an axis $z_b$ of the bushing 342. For example, the bushing 342 may be received with minimal radial clearance with respect to the bore 312 of the housing 310 while a radial clearance may exist (e.g., a larger radial clearance) between the shaft 352 and an inner surface of the bushing 342. In such a manner, as shown in FIG. 4A, the shaft 352 may tilt with respect to the axis of the bushing 342 and, for example, the axis of the bore 312. In the example of FIG. 4A, contact points 359-1 and 359-2 are shown, which may determine a maximal extent of misalignment with respect to tilting of the axis of the shaft 352 with respect to the axis of the bushing 342. As an example, such tilt may be represented by a tilt angle $\Delta\phi$. In FIG. 4B, the shaft 352 is offset radially with respect to the axis of the bushing 342 and, for example, the axis of the bore 312. In the example of FIG. 4B, contact points 359-1 and 359-2 are shown as being on a common line such that line contact is established along an outer surface of the shaft 352 and an inner surface of the bushing 342 (e.g., a bushing bore surface that defines the bore of the bushing). As shown in FIG. 4B, the offset is labeled $\Delta z_{bs}$, which is limited to a radial clearance between a diameter of the outer surface of the shaft 352 and a diameter of the inner surface of the bushing 342. Such an orientation may be referred to as a no-tilt orientation (e.g., offset without tilt). When compared to the orientation of FIG. 4A, line contact can help to distribute force between the shaft 352 and the bushing 342 as it can provide for a greater amount of surface contact between the shaft 352 and the bushing 342.

The views of FIGS. 4A and 4B also show an axial gap $\Delta z$ that exists between an outwardly facing end of the bushing 342 disposed at an axial position and an inwardly facing surface of the control arm 344 disposed at an axial position. In such an example, the axial gap may be defined by the difference between these two axial positions. As shown in the examples of FIGS. 4A and 4B, the shaft 352 may be able to move axially where the axial distance may be limited in part by the end of the bushing 342, which defines, in part, the axial gap $\Delta z$. For example, the inwardly facing surface of the control arm 344 may contact the end of the bushing 342, which, in turn, may limit axial inward movement of the shaft 352.

As illustrated in the examples of FIGS. 4A and 4B, the shaft 352 may tilt, may move radially and may move axially where such movements may be limited (see, e.g., $\Delta z$, $\Delta z_{bs}$ and $\Delta\phi$). As an example, the wastegate arm and plug 350 may act to self-center with respect to the wastegate seat 326 responsive to force applied to the control arm 344 (e.g., which is transmitted to the wastegate arm and plug 350 via the shaft 352). In such an example, self-centering may occur for effective sealing of the wastegate within the range of clearances that allow for axial and/or angular movement of the shaft 352. In such an example, a self-centered, seated plug may correspond to line contact between the shaft 352 and the bushing 342 (see, e.g., FIG. 4B).

In the examples of FIGS. 4A and 4B, the housing 310 is shown to define the bore 312, which may be via a bore wall portion of the housing 310. As shown, the bore wall portion can extend axially outward to form a rim 317, which may be at an enlarged diameter as the bore 312 may be a stepped bore. For example, the bore 312 is shown as being stepped to accommodate a rim 345 of the bushing 342. In the examples of FIGS. 4A and 4B, the rim 317 is shown as being of a lesser axial position than the rim 345. The rim 317 of the housing 310 may optionally extend axially outwardly a distance equal to or greater than the rim 345 of the bushing 342.

As shown in FIG. 4A, there can be two points of contact 359-1 and 359-2 that do not correspond to line contact as in FIG. 4B where a line of contact can exist between the points of contact 359-1 and 359-2. Without line contact, there can be force concentration at the points of contact (small surface area contact), which can increase friction and wear. As an example, a kinematic assembly may help to assure line contact, which may allow for flexibility in positioning of one or more components of a wastegate assembly of a turbocharger (e.g., actuator, etc.). As an example, an arrangement can include loading by pulling such that an actuator applies a pulling force to close a wastegate, optionally with a dead-point mechanism that may allow for reduction of energy supplied to the actuator to maintain the wastegate in a closed position. For example, consider a rotary actuator that rotates a pin coupled to a linkage where rotation cause the linkage to pull on an assembly to close a wastegate and where further rotation may allow for a dead-point state. While a rotary actuator is mentioned, a linear actuator may be utilized. As an example, a pulling force to close may help to make wastegate operation more physically stable. While pulling force to close is mentioned, as an example, a pushing force to close may be utilized.

As an example, during operational use, one or more clearances between various components (e.g., plug, arm, shaft, bore, bushing, etc.) may change. Forces that can cause such change include aerodynamic excitation, high temperatures, temperature cycling (e.g., temperatures <−20 degrees C. to >1000 degrees C.), chemical attack, friction, deterioration of materials, etc. For at least the foregoing reasons, it may be difficult to maintain effective sealing of a wastegate opening over the lifetime of an exhaust turbine assembly. As to temperature, problems at high temperatures generally include wear and loss of function and consequently leakage, lack of controllability or a combination of leakage and uncontrollability.

Figure 5:
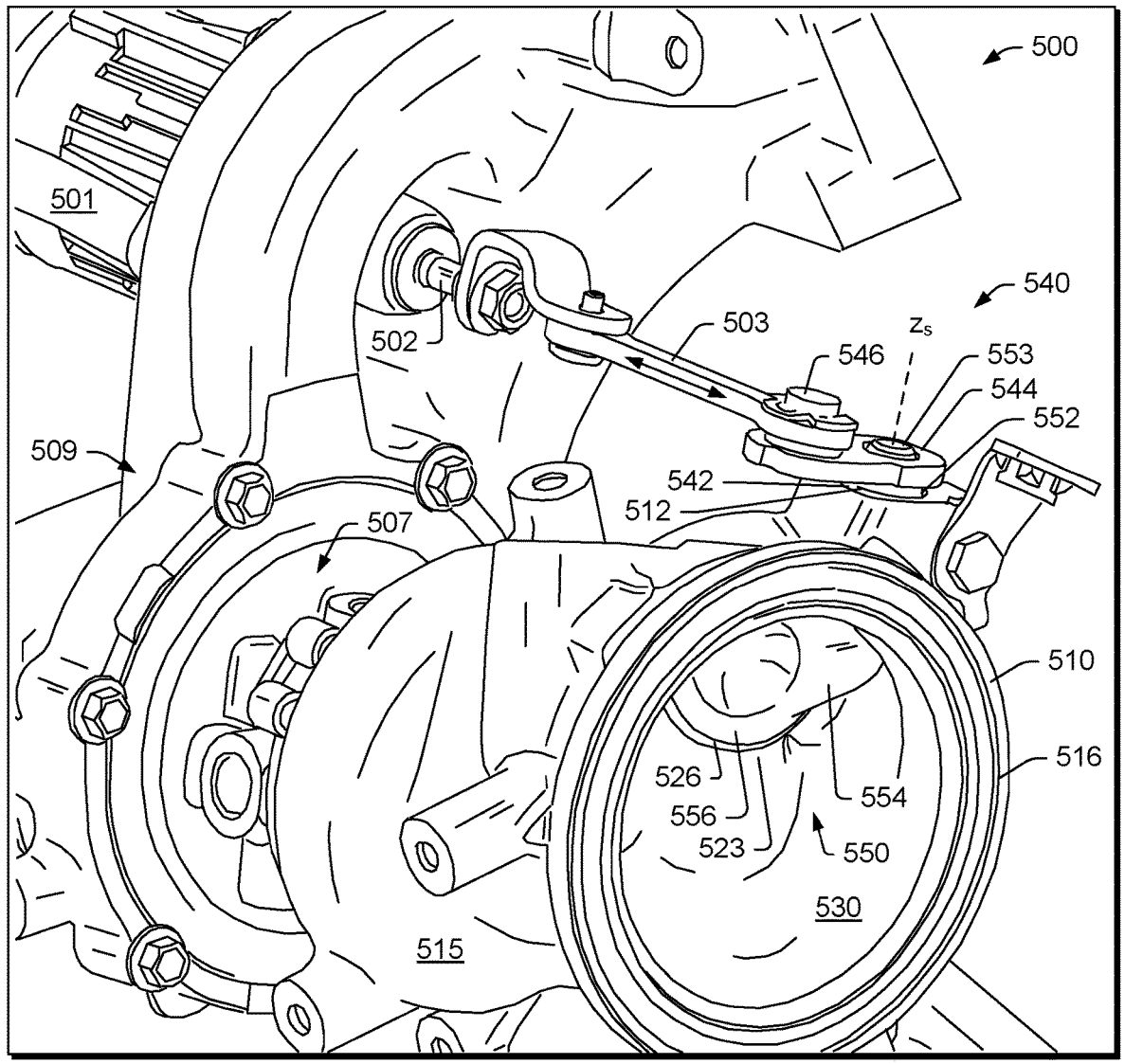
FIG. 5 is a view of an example of an assembly that includes an actuator operatively coupled to a wastegate of a turbine assembly.

FIG. 5 shows an example of an assembly 500 that includes an actuator 501 (e.g., a linear actuator), an actuation rod 502, an actuator linkage 503, a center housing 507 (e.g., to house a bearing, bearings, etc. for a turbocharger shaft, etc.), a compressor housing 509, a turbine housing 510 that includes a bore 512, a spiral wall 515 (e.g., that defines, in part, a volute), an exhaust outlet opening 516, a wastegate wall 523 that extends to a wastegate seat 526, and an exhaust chamber 530.

In the example of FIG. 5, the turbine housing 510 may be a single piece or multi-piece housing. As an example, the turbine housing 510 may be a cast component (e.g., formed via sand casting or other casting process). As shown, the turbine housing 510 includes various walls, which can define features such as the bore 512, a turbine wheel opening, an exhaust outlet opening, the chamber 530, etc. In particular, the wastegate wall 523 defines a wastegate passage in fluid communication with an inlet conduit where a wastegate control linkage 540 and a wastegate shaft, arm and plug unit 550 are configured for opening and closing the wastegate passage (e.g., for wastegating exhaust).

In the example of FIG. 5, the wastegate control linkage 540 includes a bushing 542 configured for receipt by the bore 512 of the turbine housing 510, a control arm 544 and a peg 546 and the wastegate shaft, arm and plug unit 550 includes a shaft 552, a shaft end 553, an arm 554 and a plug 556. As shown, the bushing 542 is disposed between the bore 512 and the shaft 552, for example, to support rotation of the shaft 552, to seal the chamber 530 from an exterior space, etc. The bore 512, the bushing 542 and the shaft 552 may each be defined by a diameter or diameters as well as one or more lengths.

As an example, the assembly 500 may be fitted to an exhaust conduit or other component of an internal combustion engine (see, e.g., examples of FIG. 1) via a flange such that exhaust is received via an inlet conduit that may direct exhaust to a volute (e.g., or volutes) that may be defined at least in part by the spiral wall 515. As an example, a volute (e.g., or volutes) may direct exhaust (e.g., via a nozzle or nozzles) to a turbine wheel disposed in the turbine housing 510 where the exhaust may flow and expand in a turbine wheel space defined in part by the turbine housing 510. Exhaust may then exit the turbine wheel space by flowing to the chamber 530 and then out of the turbine housing 510 via the exhaust outlet opening 516.

As to wastegating, upon actuation of the control linkage 540 (e.g., by the actuator linkage 503 being operatively coupled to the peg 546), the wastegate shaft, arm and plug unit 550 may be rotated such that at least a portion of the received exhaust can flow in the wastegate passage defined by the wastegate wall 523, past the wastegate seat 526 and into the chamber 530, rather than through a nozzle to a turbine wheel space. The wastegated portion of the exhaust may then exit the turbine housing 510 via the exhaust outlet opening 516 (e.g., and pass to an exhaust system of a vehicle, be recirculated in part, etc.).

As an example, the control linkage 540 may exert a force that acts to force the plug 556 in a direction toward the wastegate seat 526. For example, the actuator 501 may include a biasing mechanism (e.g., a spring, etc.) that exerts force, which may be controllably overcome, at least in part, for rotating the plug 556 away from the wastegate seat 526 (e.g., for wastegating). As an example, the actuator 501 may be mounted to the assembly 500. As an example, the actuator 501 may be a linear actuator, for example, for moving the rod 502 along an axis. Depending on orientation of a plug, a shaft, a control linkage and such a rod, to maintain the plug in a closed position, the rod may exert a downward force (e.g., away from the control linkage as in the example of FIG. 5) or the rod may exert an upward force (e.g., toward the control linkage). For example, where the control arm 544 (e.g., and the peg 546) of the control linkage 540 are oriented on the same "side" as the plug 556 with respect to the shaft 552, a downward force applied to the control arm 544 (e.g., via the peg 546) may act to maintain the plug 556 in a closed position with respect to the wastegate seat 526; whereas, where, for example, an approximately 180 degree span exists between a plug and a control arm, an upward force applied to the control arm may act to maintain the plug in a closed position with respect to a wastegate seat.

As an example, the rod 502 of the actuator 501 may be biased to exert a force on the control linkage 540 that causes the control linkage 540 to exert a force on the plug 556 such that the plug 556 seats against the wastegate seat 526. In such an example, the actuator 501 may at least in part overcome the force that biases the rod 502 such that the shaft 552 rotates the plug 556 away from the wastegate seat. For example, in FIG. 5, to initiate wastegating, the entire plug 556 rotates about an axis of the shaft 552 and moves away from the wastegate seat 526 (e.g., without any portion of the plug 556 moving into a wastegate opening defined by the wastegate seat 526). As an example, the moving away of the plug 556 may be facilitated by exhaust pressure. For example, in a closed position, the plug 556 experiences a pressure differential where pressure is higher below the plug 556 and less above the plug 556. In such an example, the pressure below the plug 556 acts in a direction that is countered by the closing force applied to the plug 556 via the control linkage 540 (e.g., the pressure differential acts to bias the plug 556 toward an open position). Accordingly, the closing force applied to the plug 556 should overcome pressure force from below the plug 556. Further, where the shaft 552 may include some play (e.g., axial play, etc.), the closing force applied to the plug 556 may cause the plug 556 to move with respect to the wastegate seat 526.

Figure 6:
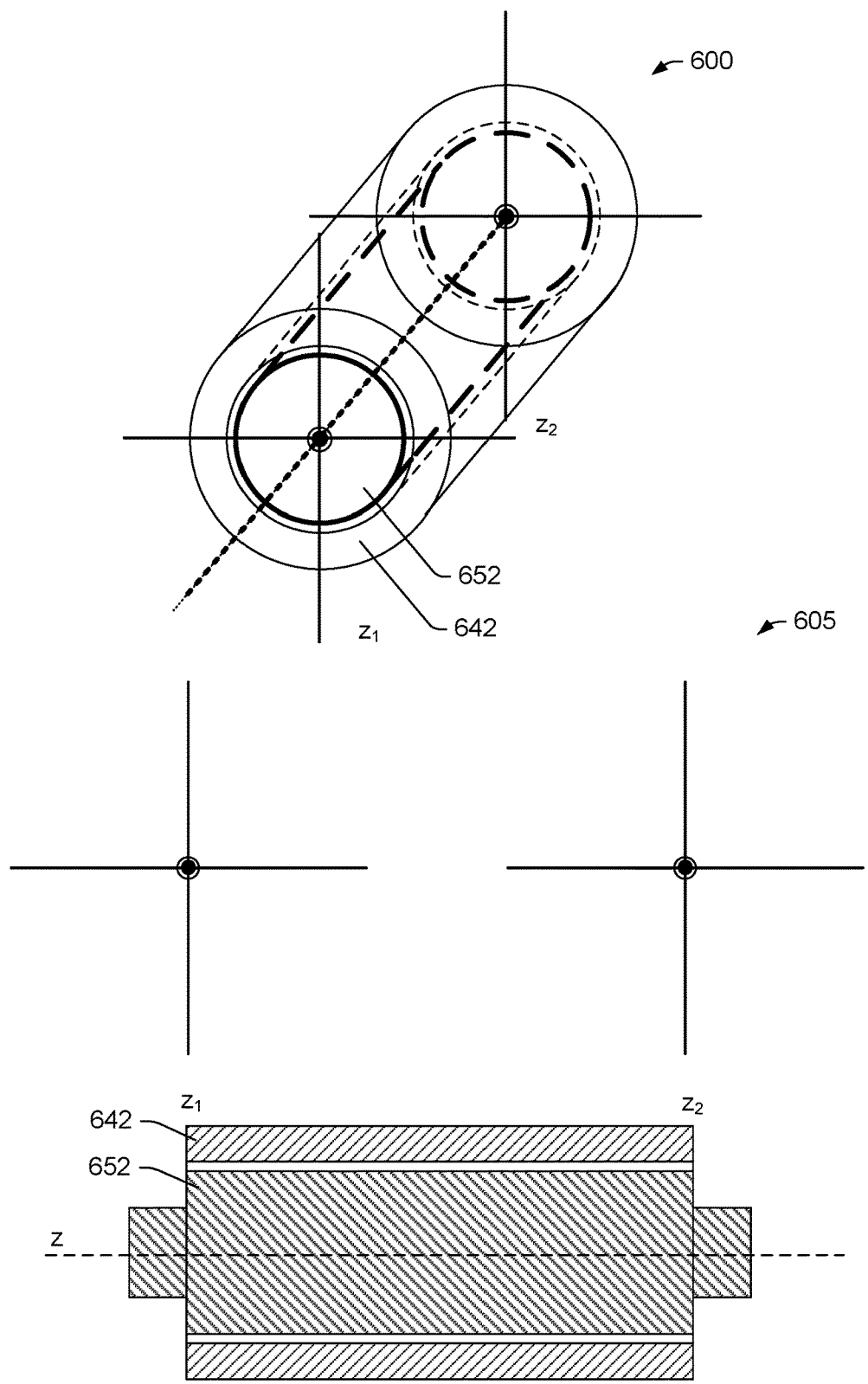
FIG. 6 is a series of diagrams of an example of an assembly and plots.

FIG. 6 shows an example of an assembly 600 that includes a shaft 652 in a bore of a bushing 642 along with plots 605 that show axes of the shaft 652 and the bore of the bushing 642 where they are coaxial at axial positions $z_1$ and $z_2$ (see, e.g., the bushing 342 and the shaft 352 of FIGS. 4A and 4B).

Figure 7:
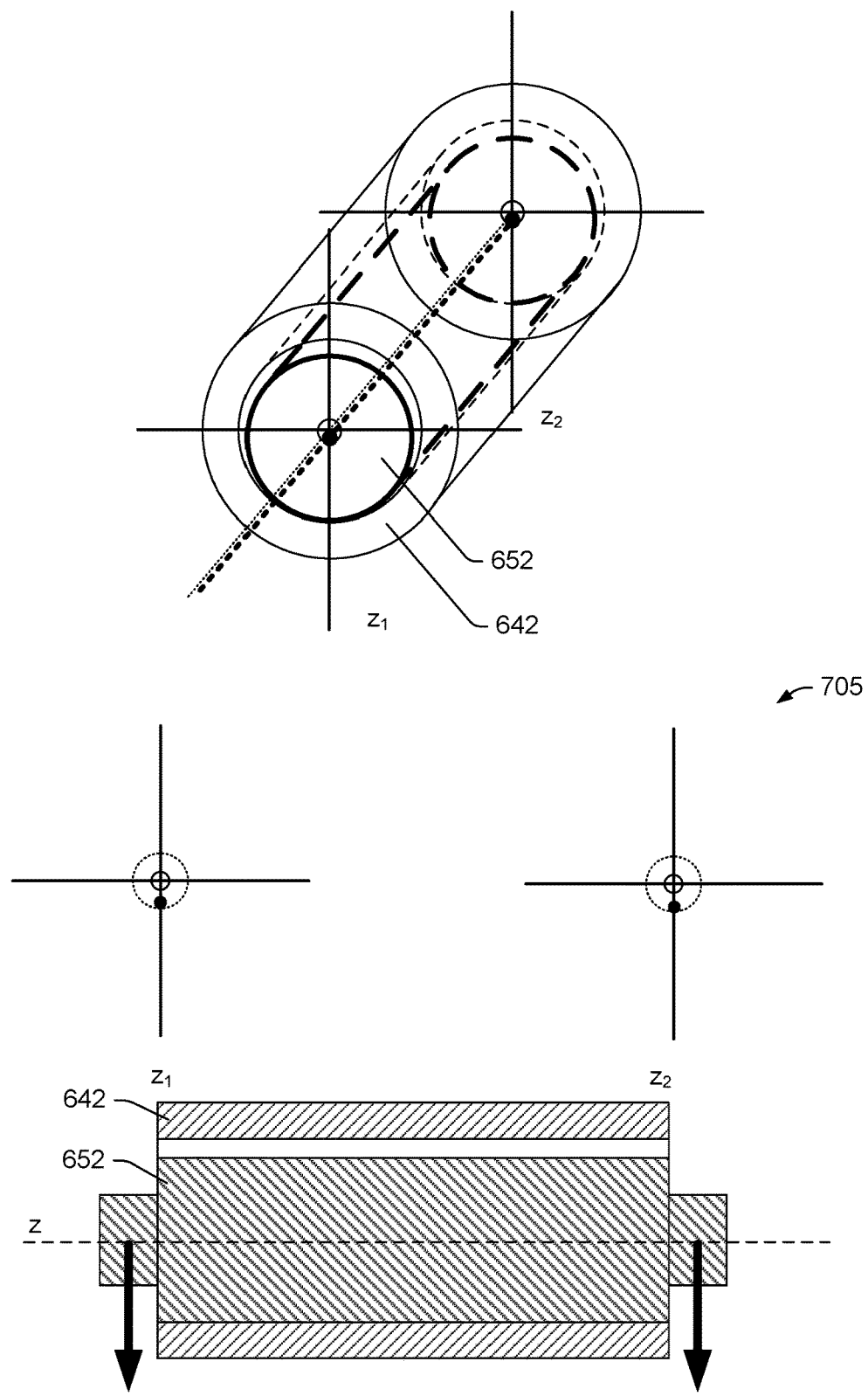
FIG. 7 is a series of diagrams of an example of an assembly and plots.

FIG. 7 shows an example of the assembly 600 along with plots 705 that show axes of the shaft 652 and the bore of the bushing 642 being offset at axial positions $z_1$ and $z_2$ such that there is line contact between the shaft 652 and the bushing 642.

Figure 8:
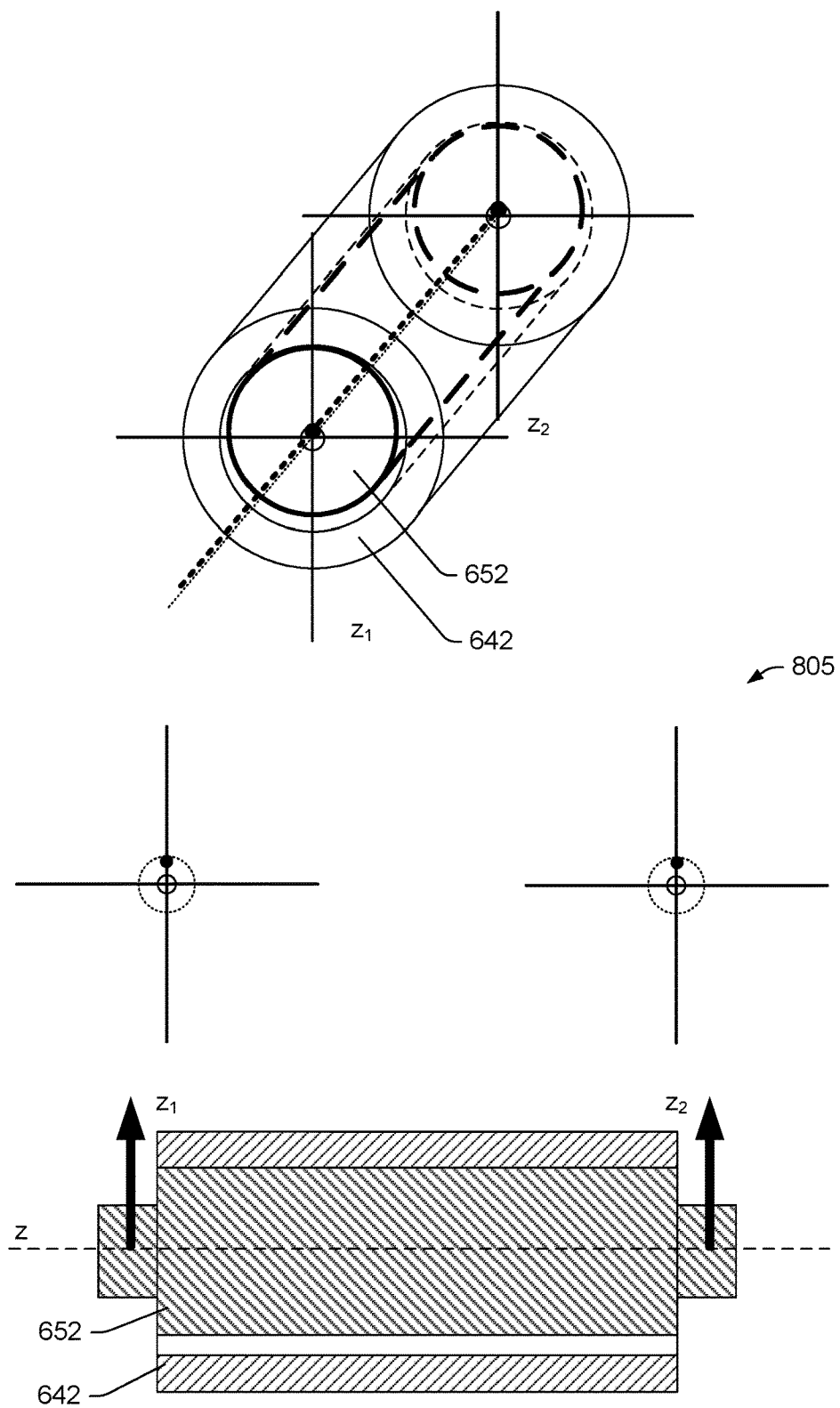
FIG. 8 is a series of diagrams of an example of an assembly and plots.

FIG. 8 shows an example of the assembly 600 along with plots 805 that show axes of the shaft 652 and the bore of the bushing 642 being offset at axial positions $z_1$ and $z_2$ such that there is line contact between the shaft 652 and the bushing 642.

Figure 9:
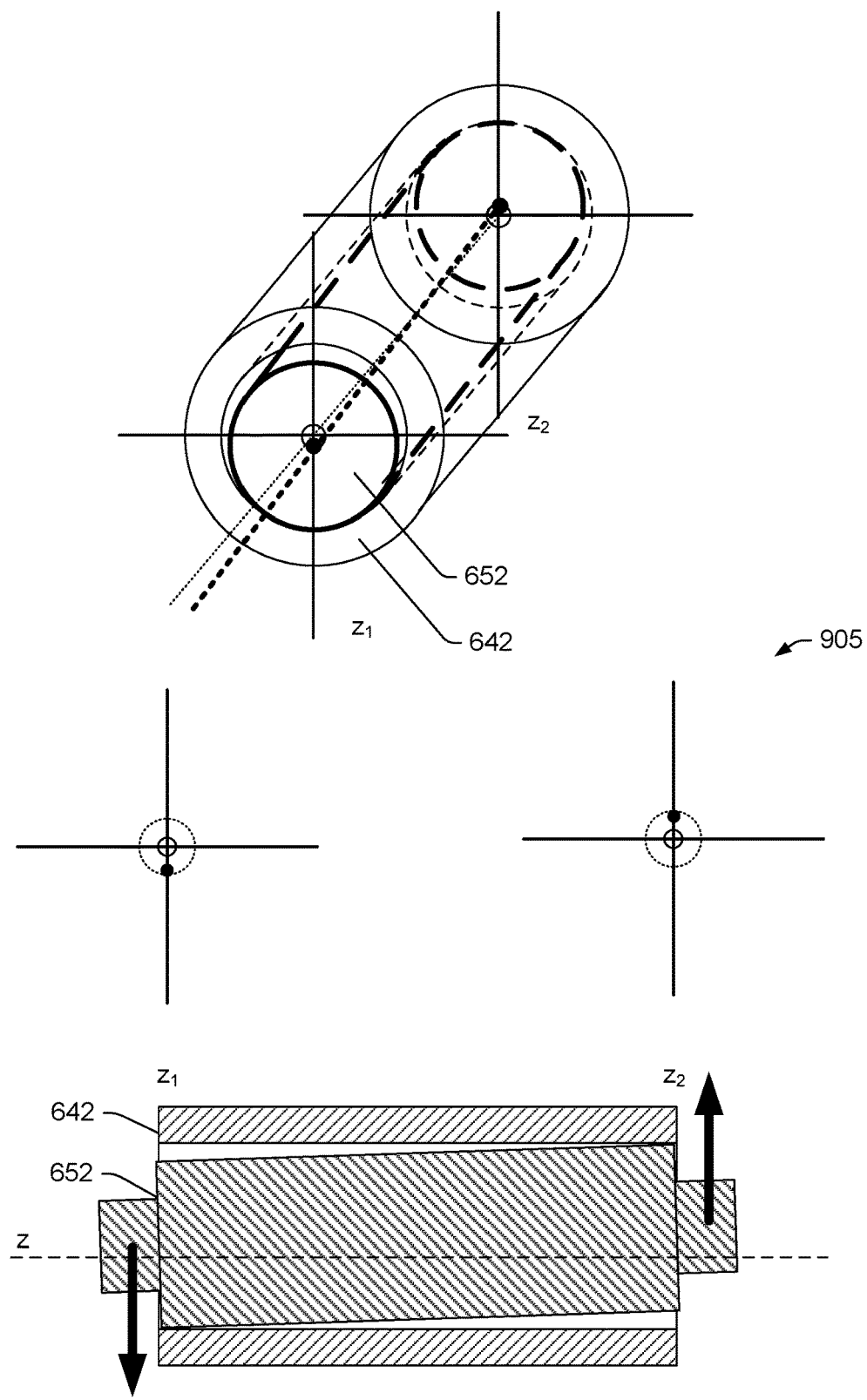
FIG. 9 is a series of diagrams of an example of an assembly and plots.

FIG. 9 shows an example of the assembly 600 along with plots 905 that show axes of the shaft 652 and the bore of the bushing 642 being offset in opposite directions at axial positions $z_1$ and $z_2$ such that there is no line contact between the shaft 652 and the bushing 642.

Figure 10:
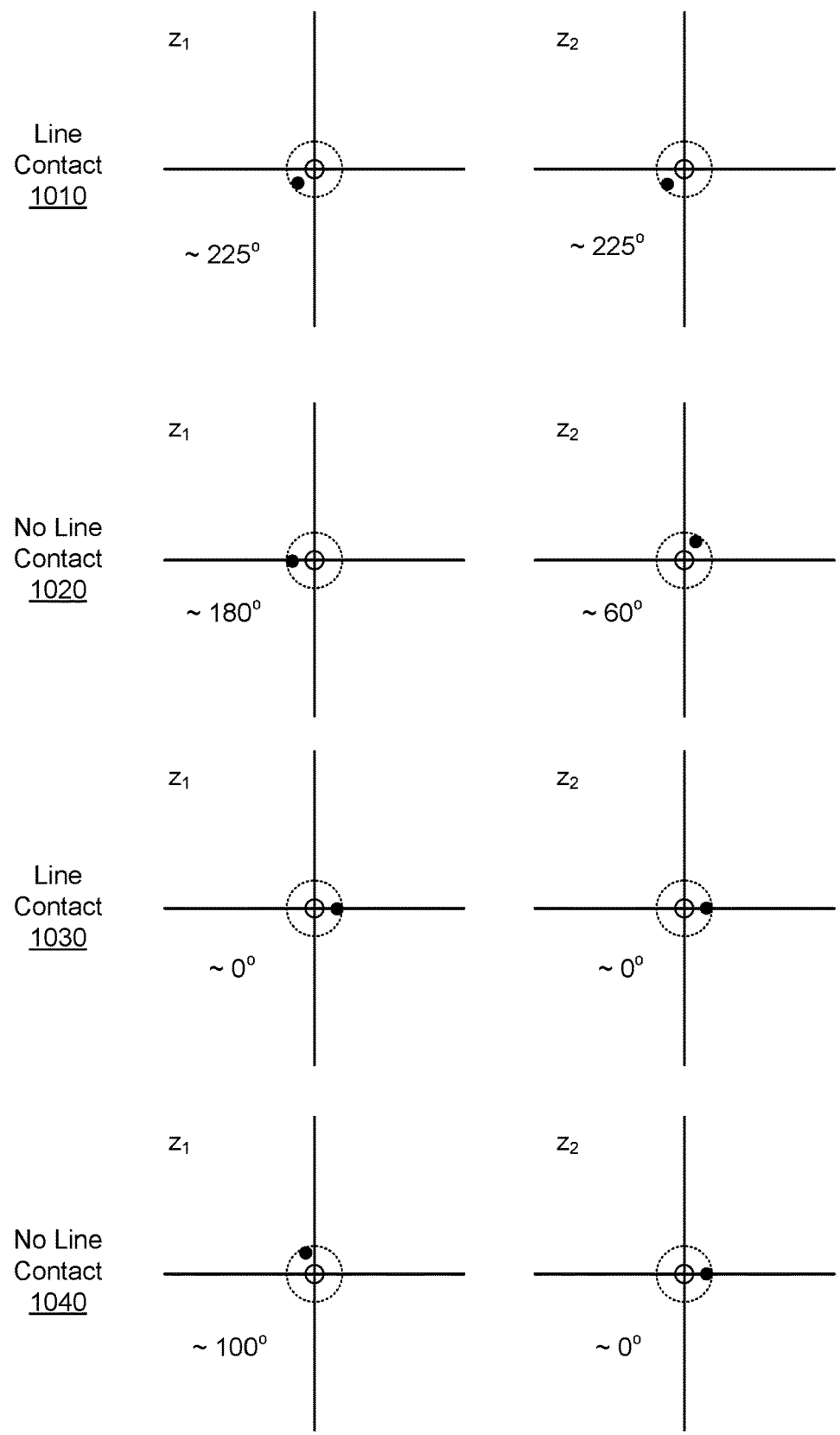
FIG. 10 is a series of example plots.

FIG. 10 shows a series of plots for line contact 1010, no line contact 1020, line contact 1030 and no line contact 1040.

Figure 11:
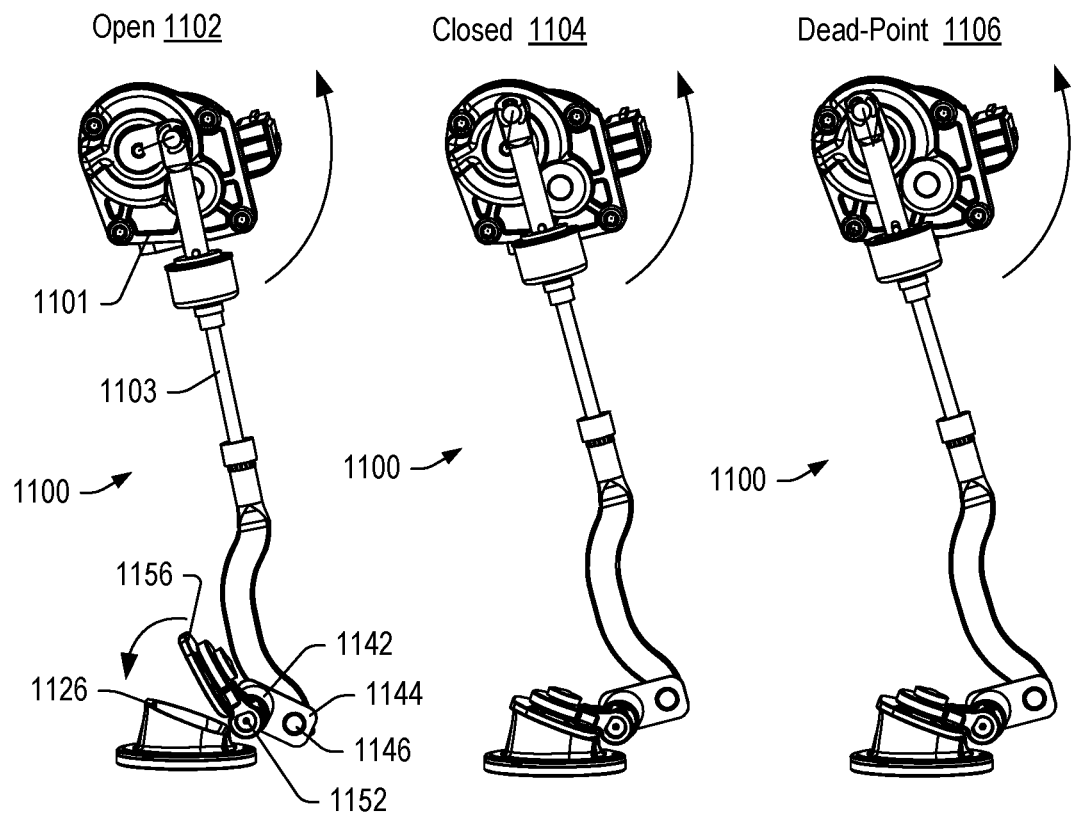
FIG. 11 is a series of diagrams of an example assembly in various example orientations.

FIG. 11 shows an example of an assembly 1100 in open 1102, closed 1104 and dead-point 1106 orientations. As shown, the assembly 1100 includes an actuator 1101 (e.g., a rotary actuator), a linkage 1103, a wastegate seat 1126, a bushing 1142, an arm 1144, a pin 1146 that operatively couples the arm 1144 and the linkage 1103, a wastegate shaft 1152 and a wastegate plug 1156. As shown, rotation of a motor of the actuator 1101 cause the linkage 1103 to move whereby counter-clockwise rotation of the motor causes the wastegate plug 1156 to move toward the wastegate seat 1126. The linkage 1103 can include a spring component such that it stretches to reach the dead-point orientation 1106 whereby the actuator 1101 can be in a low power or no power state while maintaining the closed orientation of the wastegate seat 1126 and wastegate plug 1156.

Figure 12:
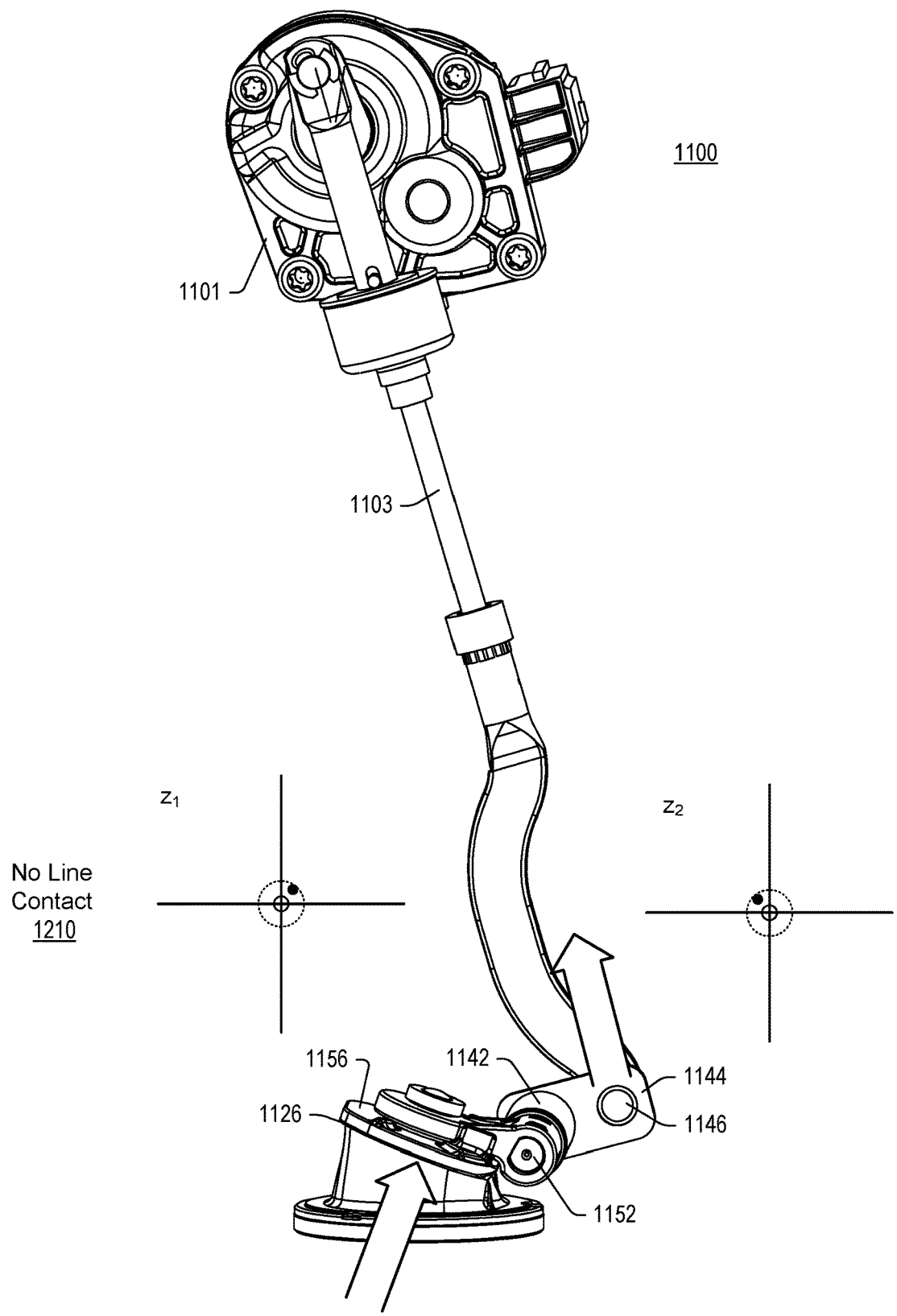
FIG. 12 is a view of the example assembly of FIG. 11.

FIG. 12 shows the assembly 1100 with respect to plots 1210 that illustrate a lack of line contact due at least to the arrangement of the linkage 1103, the arm 1144 and the wastegate plug 1156 with respect to the wastegate shaft 1152 in the bore of the bushing 1142.

Figure 13A:
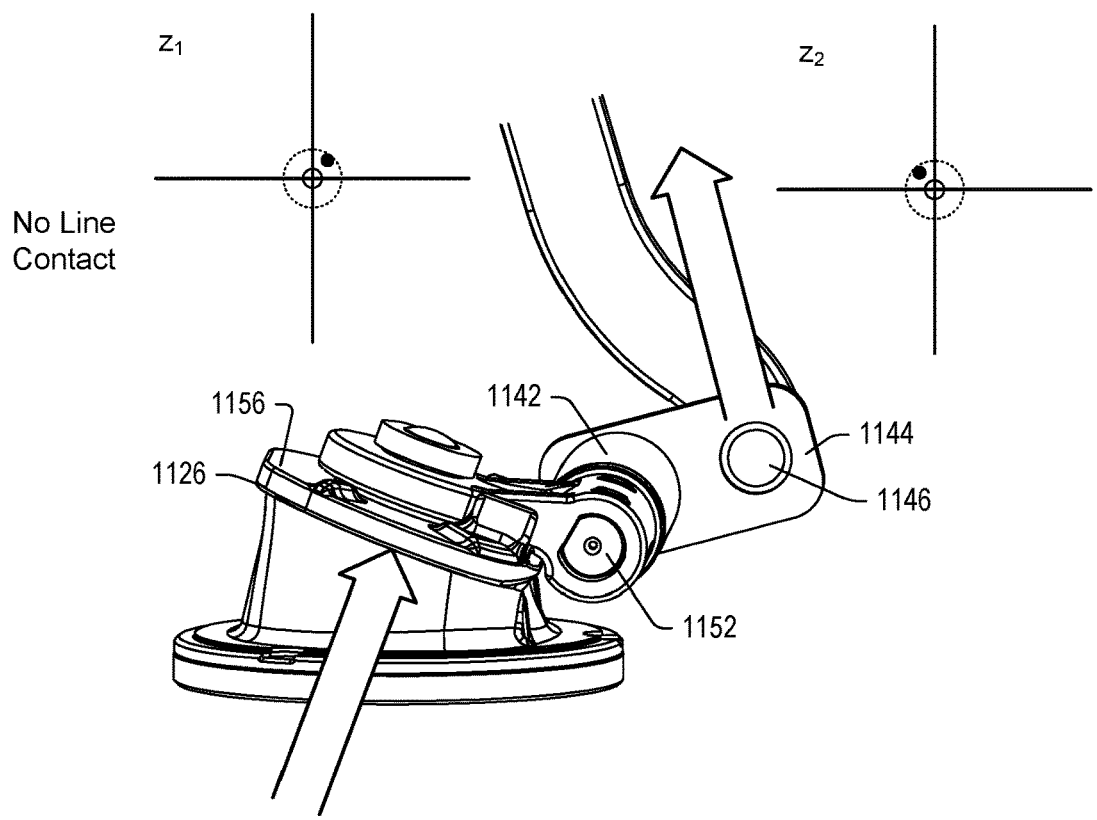
FIGS. 13A and 13B show the example assembly of FIG. 11 and another example assembly.
Figure 13B:
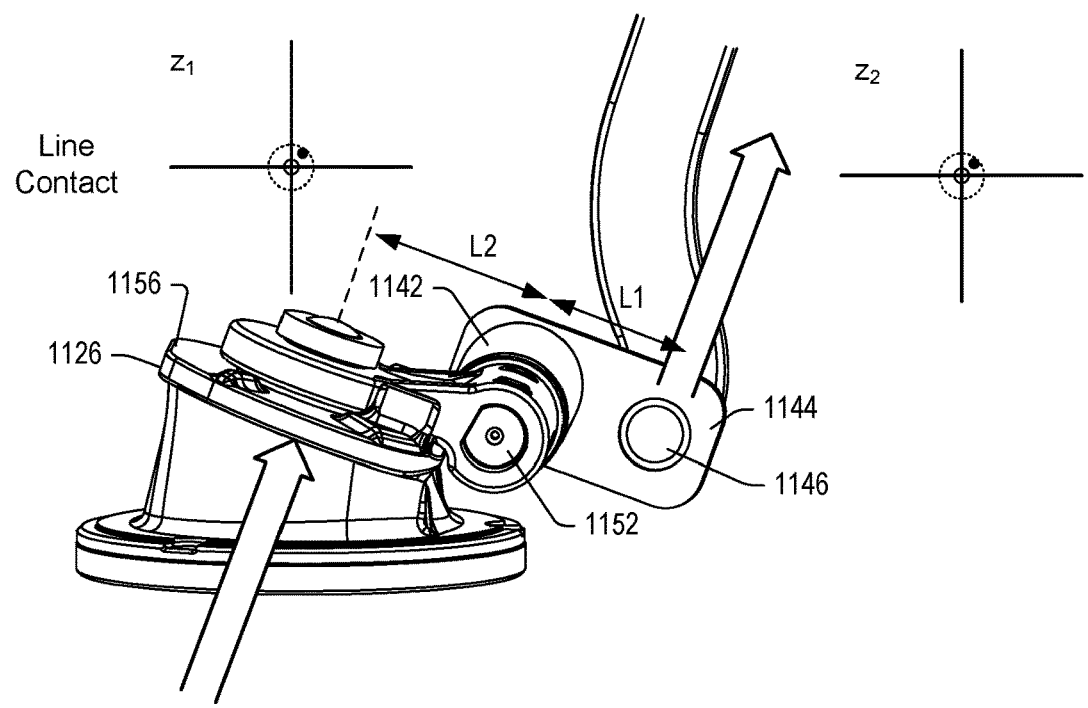

FIGS. 13A and 13B show examples of arrangements as to no line contact and line contact. In the example of FIG. 13B, the arm 1144 is at a different position than in the example of FIG. 13A. As shown in FIG. 13B, dimensions denoted L1 and L2, which may be equal or unequal, are aligned or at 180 degrees, which may be referred to as an arm angle of two arms. As to lengths of arms, one or more of such lengths may determine a moment (M). Such an approach can provide for line contact; however, having the arm 1144 at the position shown in FIG. 13B may not be optimal for positioning the actuator 1101. For example, the actuator 1101 may be mounted to a compressor housing and be limited in its position and/or orientation as to the linkage 1103. As such, in some instances, the arrangement of FIG. 13B, while desirable, may not be feasible.

As to a moment (M), it can be defined as a measure of a tendency to cause a body to rotate about a specific point or axis as subjected to a force, which is different from a tendency for a body to move, or translate, in a direction of the force. For a moment to develop, the force must act upon the body in such a manner that the body would begin to twist (e.g., bend). This can occur when a force is applied so that it does not pass through the centroid of a body. A moment can be due to a force not having an equal and opposite force directly along its line of action. For example, consider two people pushing on a door at the doorknob from opposite sides. If both of them are pushing with an equal force then there is a state of equilibrium. If one of them would suddenly jump back from the door, the push of the other person would no longer have any opposition and the door would swing away. In such an example, the person who was still pushing on the door created a moment due to the door being hinged a distance from the knob (e.g., the door rotates about an axis defined by its hinge or hinges). The magnitude of a moment of a force acting about a point or axis tends to be directly proportional to the distance of the force from the point or axis. A moment (M) can be defined as the product of the force (F) and the moment arm (L). The moment arm or lever arm can be defined as the perpendicular distance between the line of action of the force and the center of moments (e.g., Moment=Force×Distance or M=F*L). The Center of Moments may be the actual point about which the force causes rotation. It may also be a reference point or axis about which the force may be considered as causing rotation.

Figure 14:
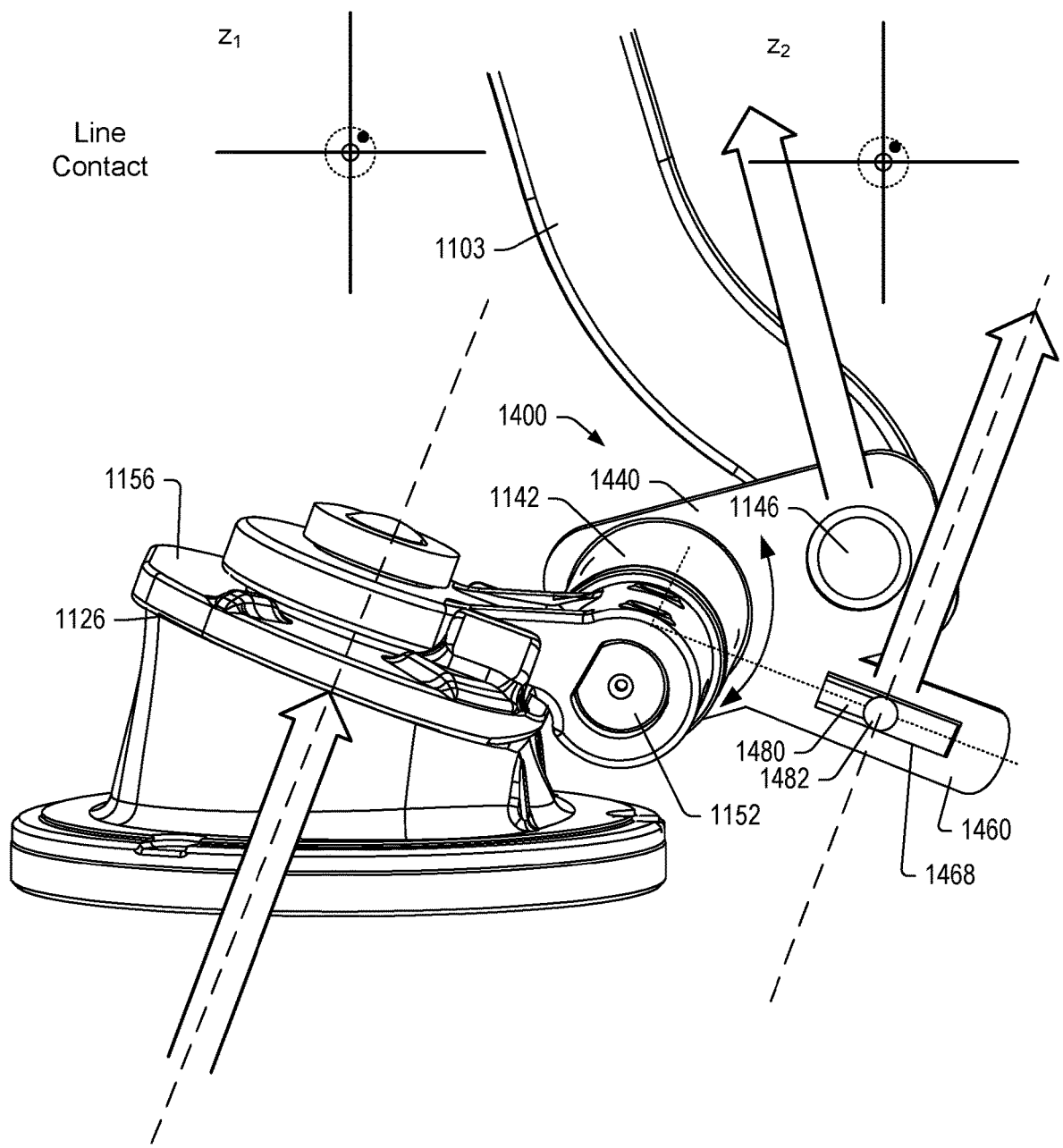
FIG. 14 shows a view of an example assembly.

FIG. 14 shows an example of an assembly 1400 that includes specialized arm, referred to as a lever 1440, which includes an extension 1460 (e.g., or arm or lever arm). As shown, the extension 1460 includes a channel 1468 that receives a pin 1482 as part of a crank 1480. Further, the lever 1440 is configured to rotate about the bushing 1142 with the bushing 1142 in a stationary position. In the example of FIG. 14, line contact can be maintained while allowing for a desired position of the pin 1146 to operatively couple the linkage 1103. Various force arrows are shown, though lengths are not necessarily corresponding to forces (see, e.g., descriptions for FIGS. 21 and 22).

Figure 15:
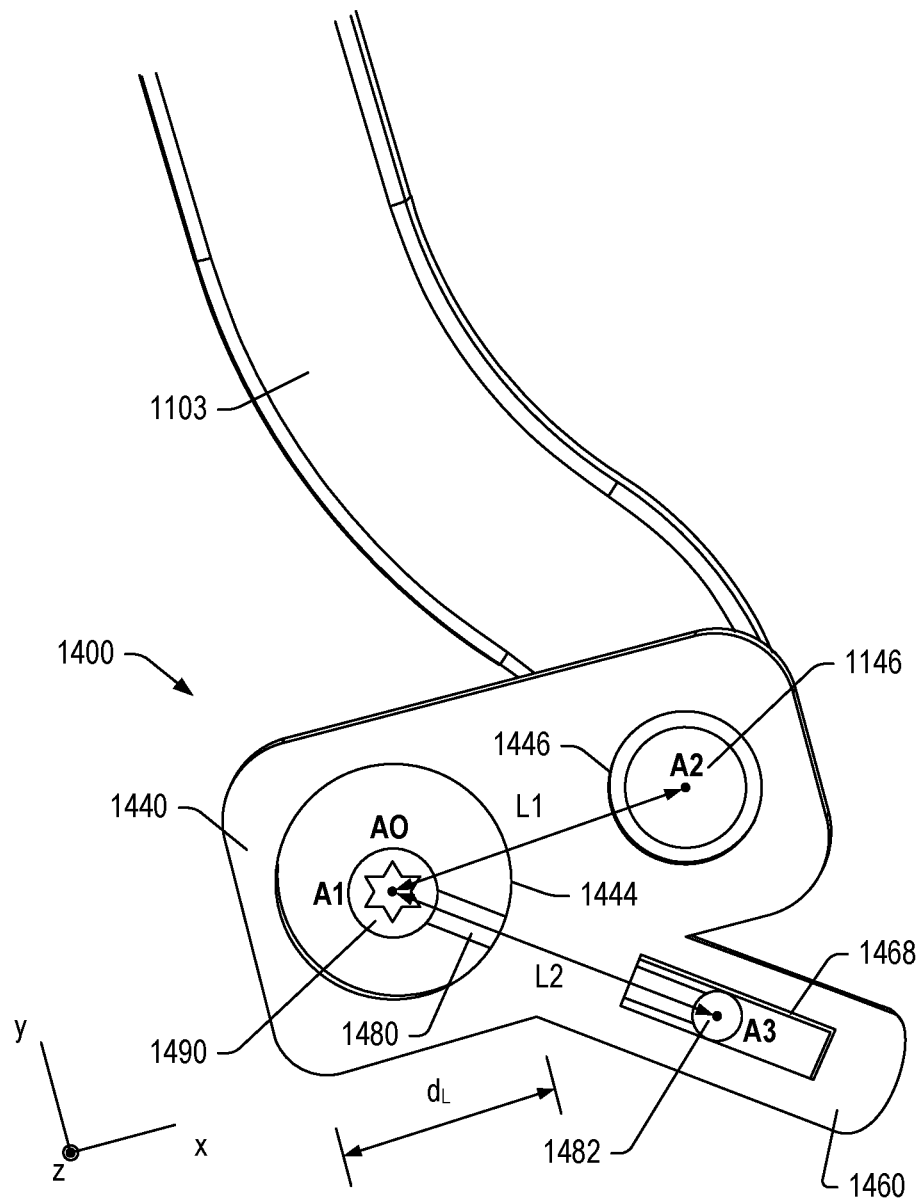
FIG. 15 shows a view of the example assembly of FIG. 14.
Figure 16A:
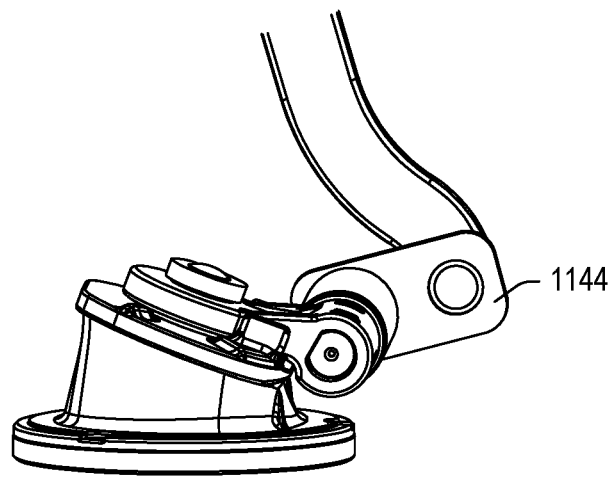
FIGS. 16A, 16B, 16C and 16D show views of the example assembly of FIG. 11 and the example assembly of FIG. 14.
Figure 16B:
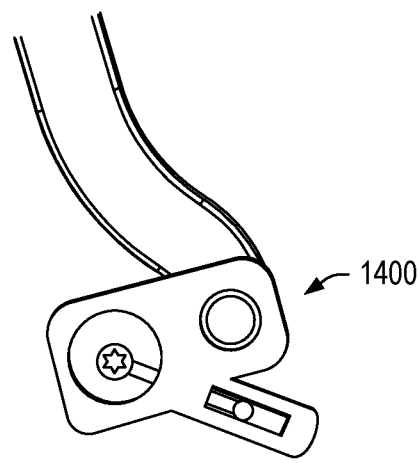
Figure 16C:
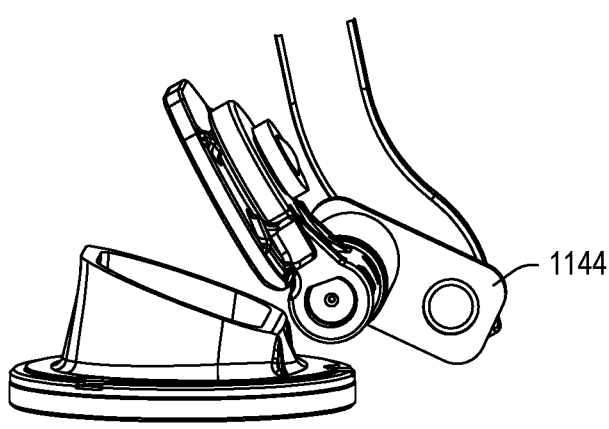
Figure 16D:
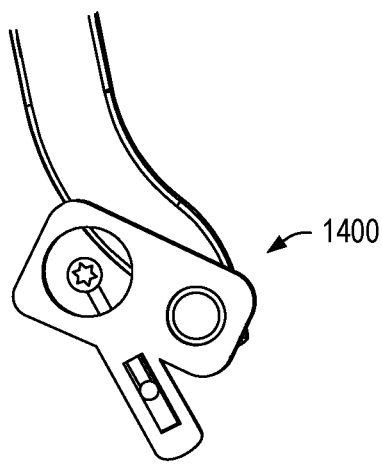

FIG. 15 shows the assembly 1400 where the crank 1480 includes a coupling 1490 that connects to a wastegate shaft such that the crank 1480 can cause the wastegate shaft to rotate. In FIG. 15, four axes are shown AO, A1, A2 and A3, where AO is an axis defined by the opening 1444, where A1 is an axis of the coupling 1490 that corresponds to the axis of rotation of a wastegate shaft, where A2 is an axis of the pin 1146 or other rotational coupling to a linkage of an actuator, and where A3 is an axis of the pin 1482 or other movable coupling of an arm of a lever. In the example of FIG. 15, the axes AO and A1 are substantially aligned.

As shown in FIG. 15, the assembly 1400 includes the opening 1444 with a diameter $d_L$. In the example of FIG. 15, the pin 1146 can be defined by a diameter and an opening that receives the pin 1146 can be defined by a diameter. As shown in the example of FIG. 15, the pin 1482 can be defined by a diameter and the channel 1468 can be defined by a channel width that accommodates the diameter of the pin 1482. The channel 1468 can be defined by a channel length, which may be along the dimension L2. In the example of FIG. 15, the dimensions L1 and L2 may define dimensions with respect to the diameter $d_L$. For example, the extension 1460 can be an arm that extends a distance from the perimeter of the opening 1444, which is at the diameter $d_L$ and the axis A2 can define an arm that extends a distance from the perimeter of the opening 1444, which is at the diameter $d_L$.

As an example, one or more portions of the assembly 1400 can be defined by dimensions in an x, y plane as well as dimensions in a z direction normal to the x, y plane (see x, y, and z coordinate system where the z-axis is directed outwardly from the x, y plane). As shown, a Cartesian coordinate system may be utilized to describe one or more features of an assembly where, for example, an axis may be aligned substantially with a dimension of the assembly. As shown in FIG. 15, the axis A1 may be substantially aligned with the axis AO as defined by the opening 1444; noting that in operation, the axis A1 may be offset with respect to the axis AO as defined by the opening 1444 in a manner that provides for line contact.

As an example, the crank 1480 can be resilient. For example, the crank 1480 can be a spring member such that in the closed orientation 1104 of FIG. 11, the actuator 1101 can move to the dead-point orientation 1106 without having a spring in the linkage 1103. For example, the crank 1480 can allow for the pin 1146 to be moved upwardly responsive to rotation of the motor of the actuator 1101 in a counter-clockwise direction (as shown in the example of FIG. 11) while maintaining a wastegate plug in a closed orientation with respect to a wastegate seat. In such an example, the pin 1482 may move upwardly while the coupling 1490 remains stationary and while the crank 1480 bends slightly. The crank 1480 may remain slightly bent while the assembly is in the dead-point orientation 1106. As mentioned, such an arrangement may alleviate the need for a spring in the linkage 1103; however, an arrangement may include both a resilient crank and a spring in the linkage 1103. As an example, a crank can be resilient and/or include a spring that biases against a lever to which the crank is operatively coupled. In such an example, an assembly can be referred to as being internally resilient or as including an internal spring.

As shown in FIG. 15, the assembly 1400 can be a turbocharger turbine wastegate assembly that includes the lever 1440 as including the opening 1444 and two arms as may be defined various axes, where each of the two arms extends a respective length from the opening; and the crank 1480 that includes the coupling 1490 as a wastegate shaft coupling, where the lever 1440 and the crank 1480 are operatively coupled via the extension 1460, being one of the arms of the lever 1440, by the pin 1482 received in the channel 1468.

FIGS. 16A, 16B, 16C and 16D shows various examples that compare the arm 1144 to the assembly 1400 where the assembly 1400 can promote line contact.

Figure 17:
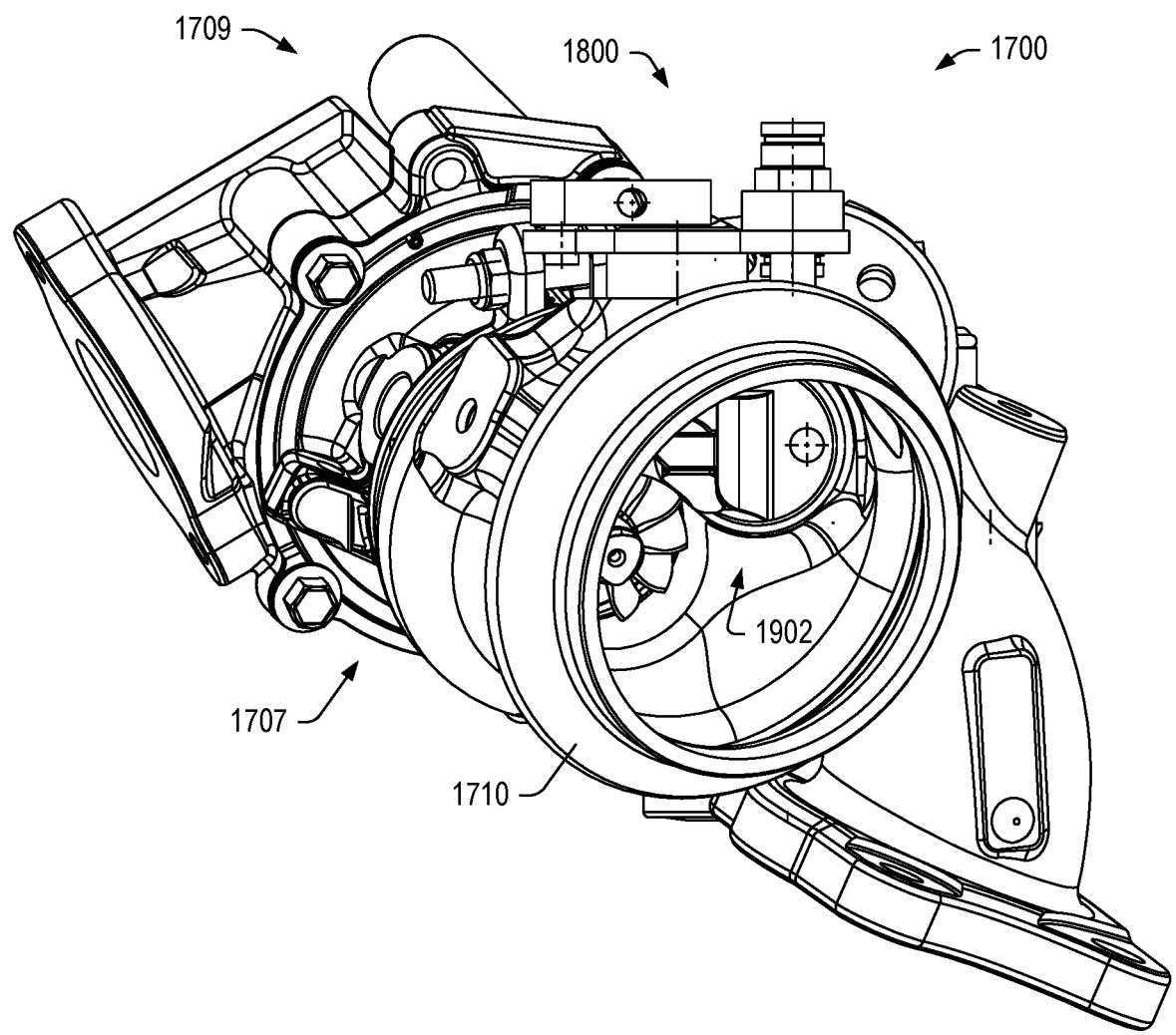
FIG. 17 shows a perspective view of an example of a turbocharger.

FIG. 17 shows an example of a turbocharger 1700 that includes a center housing 1707, a compressor housing 1709 and a turbine housing 1710 where an assembly 1800 is operatively coupled to a wastegate 1902. The turbocharger 1700 may include one or more features of the turbocharger 500 of FIG. 5, etc. As an example, the turbocharger 1700 may include an actuator that is operatively coupled to the assembly 1800, which may be a rotary actuator, a linear actuator or other type of actuator.

Figure 18A:
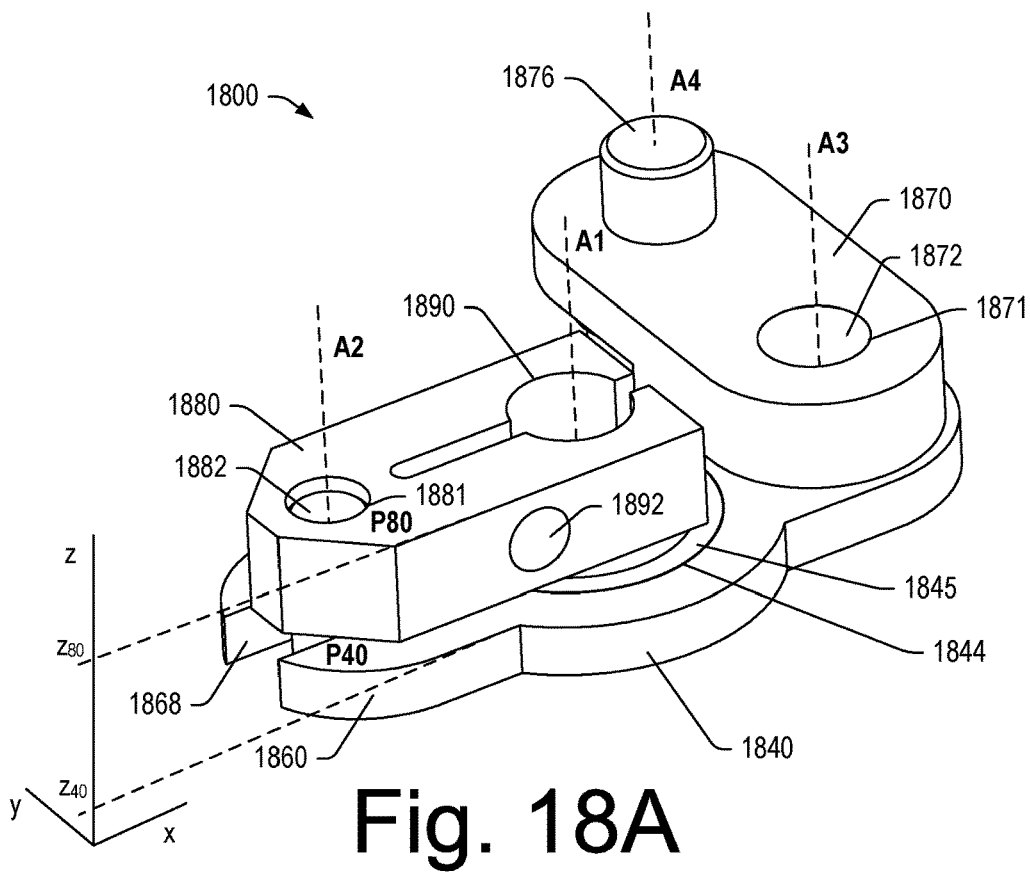
FIGS. 18A and 18B show a perspective view and a plan view of an example assembly.
Figure 18B:
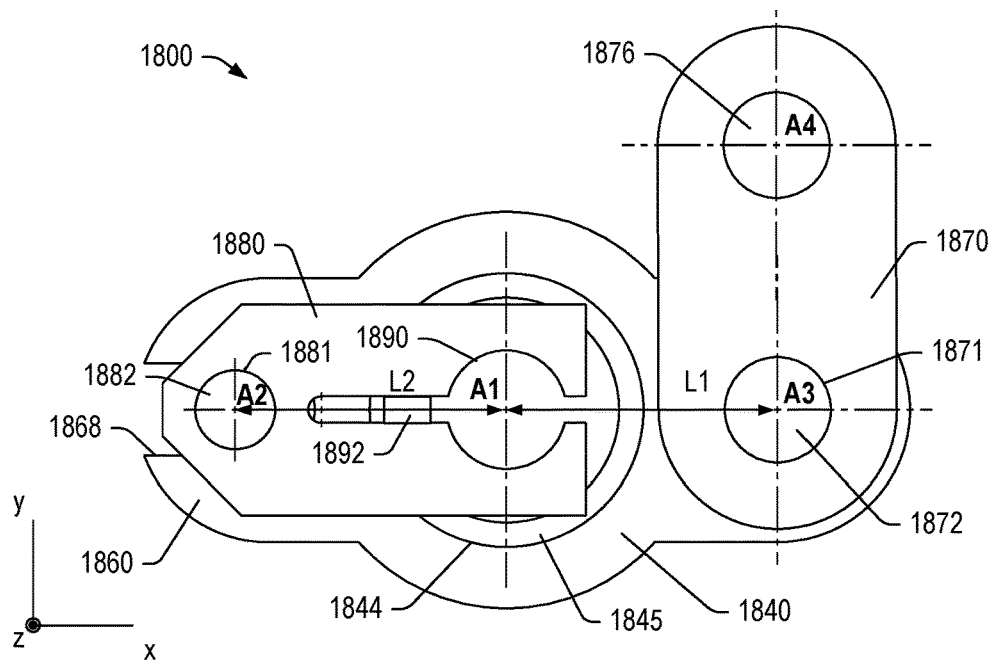

FIGS. 18A and 18B show a perspective view and a plan view, respectively, of an example of an assembly 1800. A Cartesian coordinate system in x, y and z coordinate axes is shown; noting that one or more features of the assembly 1800 can be described with respect to that coordinate system and that one or more features may be described with respect to one or more other coordinate systems such as, for example, one or more cylindrical coordinate systems as may be centered on one or more of the axes A1, A2, A3, A4, etc.

In the example shown, the assembly 1800 includes a lever 1840 that includes an opening 1844, a washer 1845 disposed in the opening 1844, a link 1870, a pin 1872 that operatively couples the lever 1840 and the link 1870, a pin 1876 that operatively couples the link 1870 to a linkage, a crank 1880 and a pin 1882 that operatively couples the lever 1840 and the crank 1880. As shown in the example of FIGS. 18A and 18B, the dimensions L1 and L2 are defined by the axes A1 and A3 and A1 and A2, respectively, and define an arm angle is 180 degrees. As an example, during operation, the axes A1 may be shifted with respect to an axis AO as defined by the opening 1844 such that the arm angle deviates slightly from 180 degrees. For example, consider FIG. 8 where the axis of the wastegate shaft 652 is shown to be displaced from the axis of the bore of the bushing 642. If displaced upwardly in the +y direction, the angle can be greater than 180 degrees; whereas, if displaced downwardly in the −y direction, the angle can be less than 180 degrees; noting that the assembly 1800 can allow for movement of the crank 1880 in the +x direction and the −x direction (e.g., as the pin 1882 can translate in the channel 1868).

As an example, the lever 1840 can be planar or include one or more planar portions. As an example, the link 1870 can be planar or include one or more planar portions. As an example, the crank 1880 can be planar or include one or more planar portions. As an example, the lever 1840 and the crank 1880 can be planar and parallel to each other (see, e.g., planes P40 and P80 in FIG. 18A and axial positions $z_{40}$ and $z_{80}$). As an example, a rotational axis of a wastegate shaft can be perpendicular to a plane defined by a planar lever. For example, in a r, Θ, z cylindrical coordinate system, the lever 1840 can be in a r, Θ plane with respect to a rotational z axis of a wastegate shaft. In such an example, the crank 1880 can be in a different r, Θ plane that is offset from that of the lever 1840. As an example, the pin 1882 can be parallel to a rotational z axis of a wastegate shaft and perpendicular to a plane of the lever 1840 and perpendicular to a plane of the crank 1880.

In the example shown, the lever 1840 includes an extension 1860 that includes a channel 1868, which gives the extension 1860 a forked shape, where the pin 1882 is received in the channel 1868. Thus, rotation of the lever 1840 about an axis defined by the opening 1844 will cause the crank 1880 to rotate. As the crank 1880 can be operatively coupled to a wastegate shaft via a clamp 1890, rotation of the crank 1880 can cause the wastegate shaft to rotate, which can, for example, cause a wastegate plug to transition from a closed orientation to an open orientation with respect to a wastegate seat or from an open orientation to a closed orientation with respect to a wastegate seat. In the example shown, a locking component 1892 can lock the clamp 1890 to a wastegate shaft; whereas, without the crank 1880 (e.g., or the crank 1880 being locked), the lever 1840 can rotate without causing rotation of a wastegate shaft. For example, the washer 1845 can be disposed about an outer surface of a bushing such that there is no direct contact between the lever 1840 and the bushing and where the lever 1840 and the washer 1845 may be made of suitable, optionally different, materials such that wear of the washer 1845 does not affect the lever 1840. As an example, the washer 1845 can be selectable with respect to a bushing and/or replaceable (e.g., upon wear). As an example, the locking component 1892 can be a bolt that includes threads where the clamp 1890 includes a threaded bore such that turning of the bolt can cause the clamp 1890 to tighten about a portion of a wastegate shaft. As an example, a clamp may include a clip that can cause the clamp to tighten about a portion of a wastegate shaft.

As an example, the washer 1845 can be made of a material that does not affect a bushing such that a bushing is less likely to be worn or otherwise damaged by rotation of the washer 1845 and/or the lever 1840. As an example, the washer 1845 can be interference fit into the opening 1844 of the lever 1840 such that the washer 1845 rotates with the lever 1840. The washer 1845 can be of a material and/or finish that can withstand operational heat associated with operation of an exhaust turbine of a turbocharger. The material and/or shape of the washer 1845 can be selected to account for thermal expansion and contraction. Such an approach can provide for rotation of the lever 1840 with minimal frictional force at an outer surface of a bushing.

As an example, the washer 1845 can be positioned and/or shaped to provide a gap between a surface of the lever 1840 and a surface of the crank 1880. For example, the washer 1845 can include a surface that is elevated with respect to a surface of the lever 1840 such that a gap exists between the crank 1880 and the lever 1840 where the crank 1880 may or may not contact the washer 1845. As an example, a side surface of the washer 1845 can be polished or otherwise finished in a manner that can reduce friction where contact may exist between the crank 1880 and the washer 1845.

In the example of FIGS. 18A and 18B, four axes are labeled as A1, A2, A3 and A4. As an example, the axes A1 and A2 can be parallel to each other and the axes A3 and A4 can be parallel to each other. As an example, A1, A2, A3 and A4 can be parallel to each other.

As shown, the axis A1 corresponds to a rotational axis of a wastegate shaft as may be clamped using the clamp 1890 of the crank 1880, where the wastegate shaft axis may be slightly offset from an axis defined by the washer 1845, which can be concentric with a cylindrical outer surface of a bushing. For example, the assembly 1800 can effectively allow for positioning of the wastegate shaft axis with a consistent offset with respect to a bushing bore axis of a bushing to provide for line contact between an outer surface of the wastegate shaft and an inner surface of the bushing that defines a bushing bore and hence the bushing bore axis.

In the example of FIGS. 18A and 18B, the assembly 1800 may be secured using the crank 1880 by clamping the clamp 1890 of the crank 1880 to a wastegate shaft. In such an arrangement, the lever 1840, being axially inwardly located from the crank 1880, can be constrained axially such that the washer 1845 is maintained about a circumference of a bushing. In such an example, the lever 1840 is not at risk of falling off. Further, the clamping force of the clamp 1890 on the wastegate shaft can be sufficient to withstand force or forces that may be applied to the lever 1840 via the link 1870 (e.g., via an actuator operatively coupled to the pin 1876 via a linkage).

As shown in FIGS. 18A and 18B, the axis A2 corresponds to the pin 1882, which is seated in a bore 1881 of the crank 1880 where the pin 1882 extends into the channel 1868 of the extension 1860 of the lever 1840. The pin 1882 can be cylindrical or otherwise formed with a surface or surfaces suitable for contact with opposing walls that define the channel 1868. A cylindrical surface can provide for suitable contact with minimal friction and, for example, allow for a longitudinal axis of the crank 1880 to be offset from a longitudinal axis of the channel 1868. In such an example, a longitudinal axis of the crank 1880 can be defined by a line that passes through the axes A1 and A2 while a longitudinal axis of the channel 1868 can be defined by a line disposed intermediate opposing walls of the channel 1868. As mentioned, the crank 1880 allows for positioning of the wastegate shaft in a bushing bore with line contact. In such an arrangement, the axis A1 can be offset from an axis defined by the washer 1845 or the opening 1844 of the lever 1840. As may be appreciated, where an offset exists, the longitudinal axis of the crank 1880 can be non-parallel to the longitudinal axis of the channel 1868. For example, in FIG. 18B, the axis A1 can be offset such that a wastegate shaft is not concentric with a bushing bore but rather eccentric with the bushing bore to create line contact. With the pin 1882 being cylindrical in the channel 1868, the crank 1880 can rotate such that its longitudinal axis and that of the channel 1868 differ.

As to the axis A3, it can be defined by the pin 1872, which may be disposed in a bore 1871 of the link 1870 and extending into a corresponding bore of the lever 1840. As an example, the longitudinal axis of the link 1870 defined between the axes A3 and A4 may be adjustable with respect to the longitudinal axis of the lever 1840, which may be defined by the channel 1868 or, for example, a line passing through the axes A2 and A3 or, for example, a line passing through an axis of the washer 1845 and the axis A3. As to the link 1870 be adjustable with respect to the lever 1840, consider a toothed engagement of the pin 1872 with the link 1872 and the lever 1840 or, for example, consider a threaded bolt and nut arrangement that can be used to clamp the link 1870 and the 1840 in a fixed manner.

As to the axis A4, it can correspond to a pivotable axis of a linkage that is operatively coupled to an actuator. As an example, a linkage can include a bore that fits about the pin 1876 where the linkage can have a longitudinal axis where the actuator translates the linkage along the longitudinal axis. For example, a pushing action on the pin 1876 can cause the lever 1840 to rotate clockwise and a pulling action of the pin 1876 can cause the lever 1840 to rotate counterclockwise. In such an example, clockwise rotation can cause one wall of the channel 1868 to contact the pin 1882; whereas, counter-clockwise rotation can cause an opposing wall of the channel 1868 to contact the pin 1882.

As shown in FIGS. 18A and 18B, the assembly 1800 can be a turbocharger turbine wastegate assembly that includes the lever 1840 as including the opening 1844 and two arms as may be defined various axes, where each of the two arms extends a respective length from the opening 1844; and the crank 1880 that includes the clamp 1890 as a coupling that is a wastegate shaft coupling, where the lever 1840 and the crank 1880 are operatively coupled via the extension 1860, being one of the arms of the lever 1840, by the pin 1882 received in the channel 1868.

As an example, an assembly can be configured in a manner that introduces minimal frictional force and can be operatively coupled to a wastegate in a manner that provides for a more optimal alignment of a wastegate shaft with respect to a bushing. Such an approach can help to reduce actuator load, make actuator load more consistent with respect to time, reduce linkage load, make linkage load more consistent with respect to time, etc. While an assembly such as the assembly 1800 can introduce additional components and may introduce slightly more mass, a reduction in load and an increase in consistency of operation can outweigh such concerns. Further, an assembly such as the assembly

1800 can provide for more flexibility in terms of locating components in an engine compartment. For example, position of a linkage and/or an actuator may be more flexible given an assembly that can be adjustable.

Figure 19A:
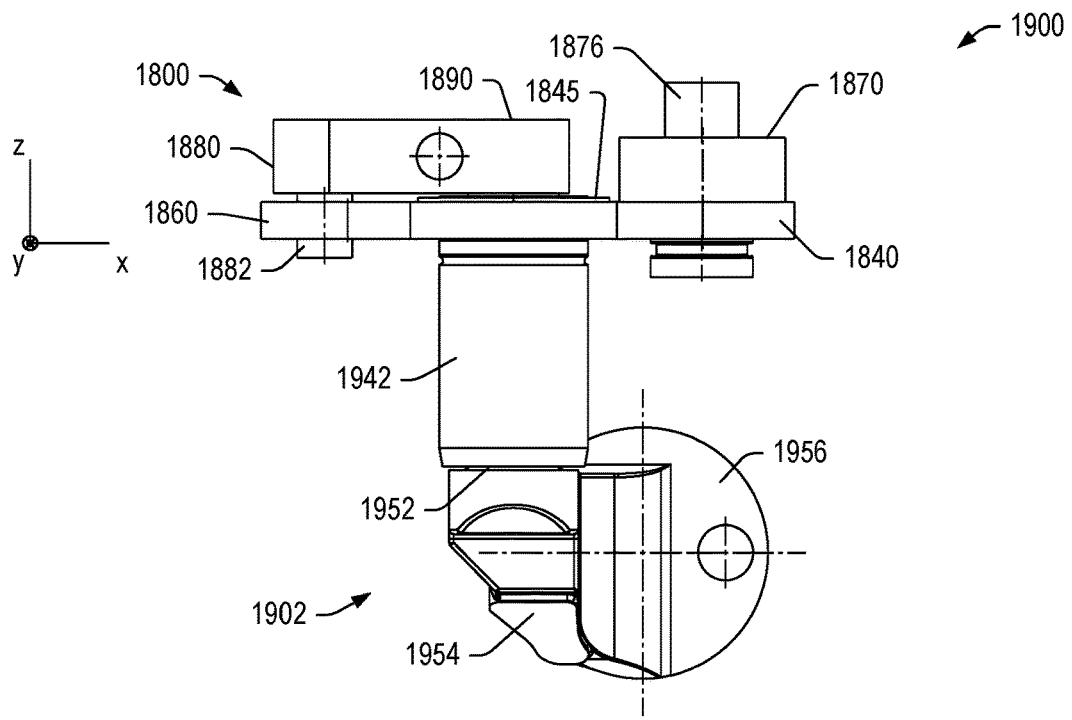
FIGS. 19A and 19B show a side view and a cross-sectional view of an example assembly.
Figure 19B:
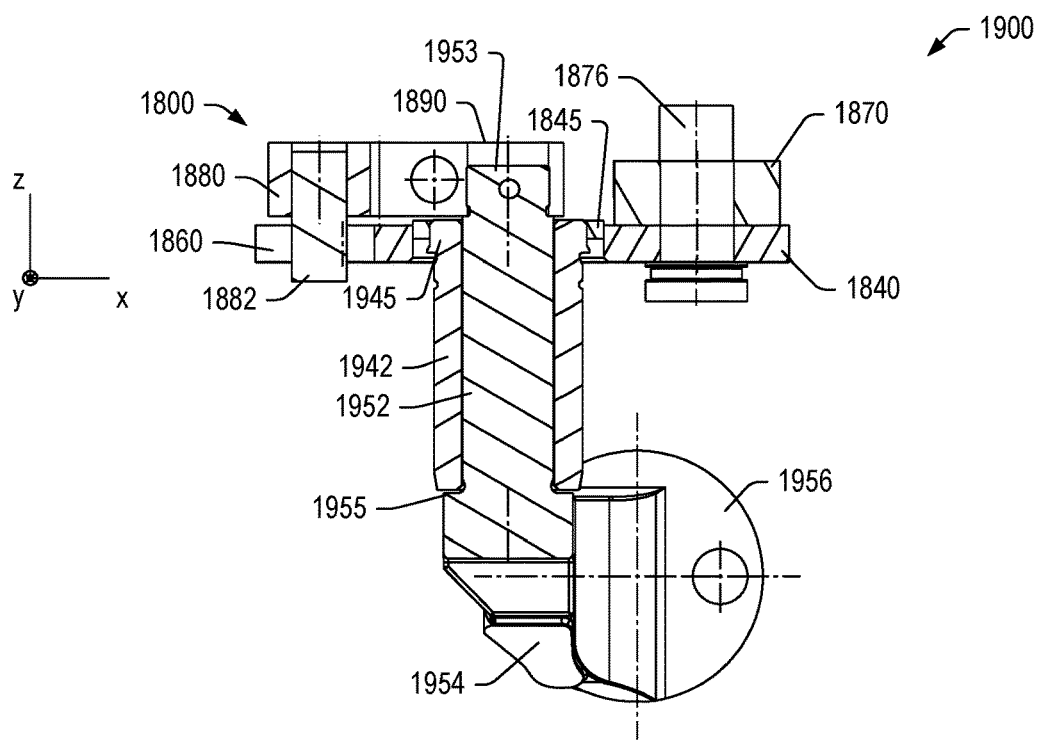

FIGS. 19A and 19B show a side view and a cross-sectional view of an example of a wastegate assembly 1900 that includes the assembly 1800. As shown, the wastegate assembly 1900 includes the wastegate 1902 where the wastegate 1902 includes a wastegate shaft 1952, a wastegate arm 1954 that extends from the wastegate shaft 1952 and a wastegate plug 1956 that extends from the wastegate arm 1954 (see also FIG. 17). The wastegate 1902 is substantially L-shaped in the side view, which may be referred to as a hockey stick shape. The wastegate plug 1956 can define a plane, which may be with respect to a contact portion that contacts a planar wastegate seat to close a wastegate opening of a wastegate passage. Rotation of the wastegate shaft 1952 about its rotational axis causes the plane of the wastegate plug 1956 to move, for example, to different Q angles as may be defined in a cylindrical coordinate system with a z axis being defined by the rotational axis of the wastegate shaft 1952, where the angles include an angle that corresponds to a closed orientation of the wastegate 1902 and angles that correspond to a plurality of open orientations of the wastegate 1902. As an example, a 0 degree angle may be assigned to the closed orientation of the wastegate 1902 such that a non-zero degree angle (e.g., positive or negative) corresponds to an open orientation of the wastegate 1902. In the example of FIGS. 19A and 19B, using the plan view of FIG. 18B as a reference, an open orientation of the wastegate 1902 has a negative non-zero degree angle such that a transition from a closed orientation to an open orientation is clockwise (CW) and a transition from an open orientation to a closed orientation is counter-clockwise (CCW). In such an arrangement, a pulling force on the link 1870 closes the wastegate 1902 while a pushing force on the link 1870 opens the wastegate 1902, which may be referred to as pull to close and push to open. As an example, an assembly may be arranged in a push to close and a pull to open configuration.

In the example of FIGS. 19A and 19B, the assembly 1900 includes a bushing 1942 where the wastegate shaft 1952 is received by a bore of the bushing 1942. As explained, a bushing such as the bushing 1942 can be disposed at least in part in a bore of a housing, such as a turbine housing, that includes a wastegate seat. As shown, the wastegate shaft 1952 can include an end 1953 and a shoulder 1955 where the end 1953 can be of a lesser diameter than a portion of the wastegate shaft 1952 that is disposed in the bushing 1942 and where the shoulder 1955 can step radially outwardly to a diameter that is greater than the portion of the wastegate shaft 1952 that is disposed in the bushing 1942. As shown, the clamp 1890 of the crank 1880 is clamped to the end 1953 and the shoulder 1955 can abut against an end surface of the bushing 1942. As an example, the wastegate 1902 and the crank 1880 can move axially where the crank 1880 may limit movement inwardly and where the shoulder 1955 may limit movement outwardly. In such an example, the pin 1882 can be axially fixed in the bore 1881 of the crank 1880 and move axially with respect to the channel 1868 of the lever 1840. In such an example, the pin 1882 has an axial length that is sufficiently long to not be dislodged from the channel 1868 of the lever 1840 during operation.

As mentioned, the crank 1880 may abut the washer 1845 and/or the lever 1840 to limit axially inward movement and the shoulder 1855 may abut the end surface of the bushing 1942 to limit axially outward movement. An axial gap may be defined by clamping of the clamp 1890 of the crank 1880 to the end 1953 of the wastegate shaft 1952. As shown, the axial gap tends to be relatively small (e.g., less than a few millimeters, less than a millimeter, etc.). Such an axial gap may account for thermal effects such that components do not bind and may be limited in size to help reduce leakage of exhaust from an interior exhaust space to an exterior ambient space.

As shown in the example of FIGS. 19A and 19B, the bushing 1942 includes a rim 1945 that has an enlarged outer diameter, when compared to the portion of the bushing 1942 that is at least in part disposed in a bore of a housing, where the washer 1845 is disposed about the rim 1945.

As an example, the washer 1945 can be dimensioned to seat on the rim 1945 such that it cannot move axially inwardly. As an example, the washer 1945 can be utilized to position the lever 1840, for example, at a desired axial position with respect to the bushing 1942 and/or a housing. As mentioned, the crank 1880, once clamped to the wastegate shaft 1952, can limit axially outward movement of the lever 1840, for example, to secure the lever 1840 between a housing and the crank 1880. As mentioned, the lever 1840 can rotate about the bushing 1942 where, in the example of FIGS. 19A and 19B, such rotation is about the rim 1945 of the bushing 1942.

As shown in the example of FIGS. 19A and 19B, the assembly 1800 can be multi-planar where one plane defined by the lever 1840 rotates about the rim 1945 of the bushing 1942 and where another plane defined by the crank 1880 is offset and parallel to the plane defined by the lever 1840 and rotates with the wastegate shaft 1952 as the crank 1880 is fixed to the end 1953 of the wastegate shaft 1952. As explained, the lever 1840 and the crank 1880 can be operatively coupled to each other via a portion of the pin 1882 being fixed in the bore 1881 of the crank 1880 and another portion of the pin 1882 being received in the channel 1868 of an extension 1860 of the lever 1840.

FIGS. 20A and 20B show a perspective view of a portion of the turbocharger 1700 and a cut-away view of a portion of the turbocharger 1700 of FIG. 17, respectively, where the turbine housing 1710 includes a bore 1712 and a wastegate seat 1726. As shown, the bushing 1942 is received at least in part by the bore 1712 and the wastegate plug 1756 is in contact with the wastegate seat 1726 (e.g., a closed orientation). In FIG. 20A, the compressor housing 1709 is shown as including a bracket that can be utilized for mounting of an actuator (e.g., linear, rotary, etc.). An actuator may be mounted to a bracket of the compressor housing 1709 to position the actuator at a distance from the turbine housing 1710 to reduce exposure of the actuator to heat energy and high temperatures of the turbine housing 1710.

In the example of FIGS. 20A and 20B, the lever 1840 defines a plane about the rim 1945 of the bushing 1942 in which the lever 1840 can rotate and the crank 1880 defines a plane about the end 1953 of the wastegate shaft 1952 in which the crank 1880 can rotate. As explained, the assembly 1800 can provide for line contact between an outer surface of the wastegate shaft 1952 and an inner surface of the bushing 1942, which defines a bore of the bushing 1942.

FIG. 20C shows an example of an arrangement where the lever 1840 includes the opening 1844 disposed about a rim 1717 of the housing 1710 (see also, e.g., FIGS. 4A and 4B and the rim 317). In such an example, a washer 1847 may be disposed in the opening 1844 and about the rim 1717, which may be a washer akin to the washer 1845. In the example of FIG. 20C, the washer 1845 is shown, which may be utilized for one or more purposes such as, for example, fitting the bushing 1842 into the bore 1712 of the housing 1710, providing additional sealing between the bushing 1842 and the housing 1710, providing additional support for the rim 1717 of the housing 1710 (e.g., for carrying forces, etc.). As an example, the lever 1840 may optionally be utilized without a washer or washers (e.g., consider direct contact with a bushing, direct contact with a housing, etc.).

FIG. 20D shows an example of an arrangement where the lever 1840 includes the extension 1860 as one of two arms of the lever 1840 with a pin 1862 and where the crank 1880 includes a channel 1888 that can receive the pin 1862. In such an example, the crank 1880 can move to provide for a displacement of the wastegate shaft axis of the wastegate shaft 1952 with respect to a bushing bore axis of a bushing bore of the bushing 1942 where such a displacement allows for line contact between an outer surface of the wastegate shaft 1952 and a surface of the bushing bore of the bushing 1942.

Figure 21:
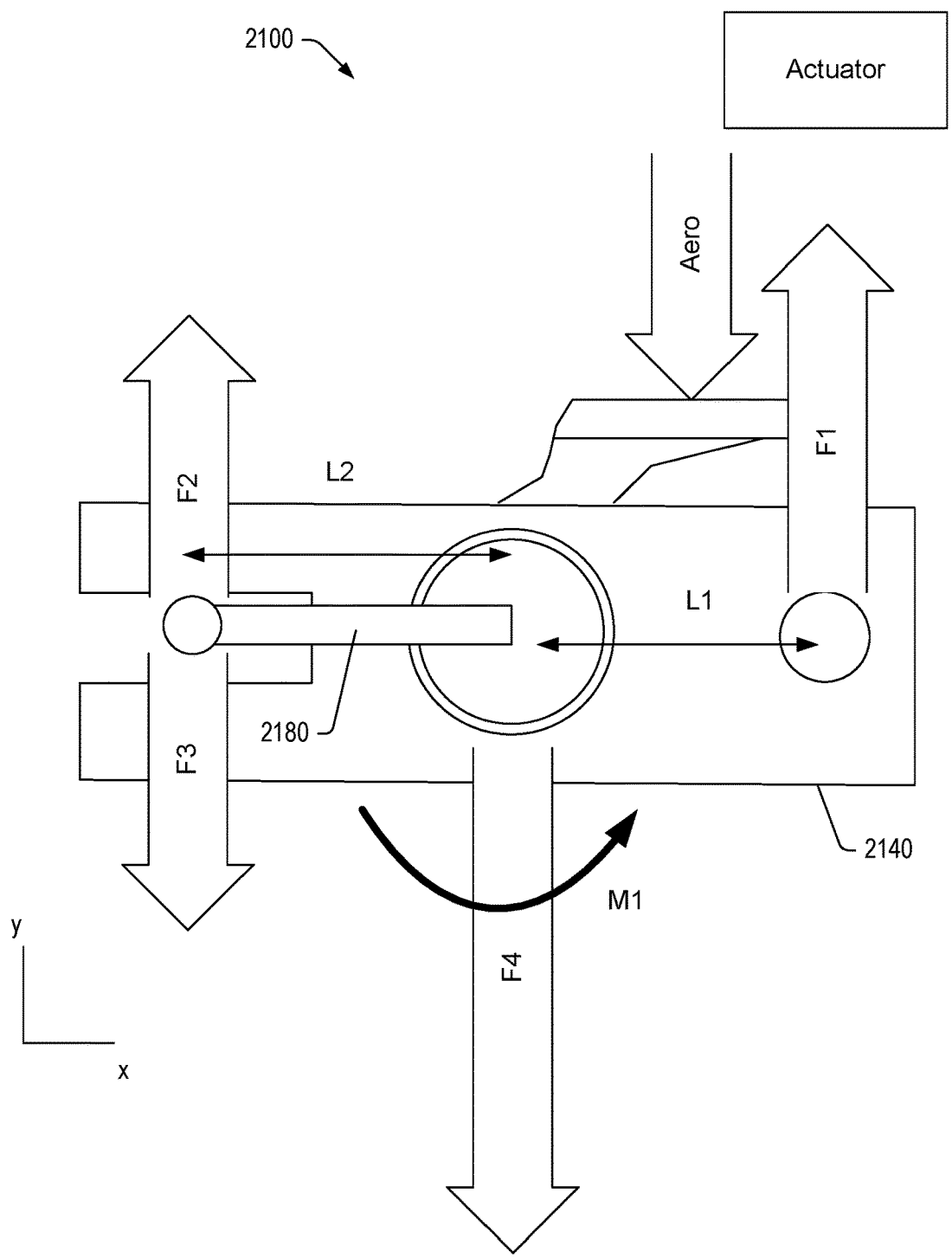
FIG. 21 shows an example of a diagram of an assembly with various forces and dimensions.

FIG. 21 shows a diagrammatic example of an assembly 2100 with various force arrows and dimensions. As shown in FIG. 21, a force F1 is applied as a pulling force by an actuator where a lever 2140 with arms dimensioned L1 and L2 rotates about a bushing and applies a force F4 to the bushing. As shown, a crank 2180 is operatively coupled to the lever 2140 via a pin received in part by a channel of one of the arms of the lever 2140 (e.g., an extension of the lever). The forces F2 and F3 are action/reaction forces between the pin and one wall of the channel of the arm of the lever 2140. Another force arrow shows an aerodynamic force applied to a wastegate plug of a wastegate where the wastegate includes a wastegate shaft disposed at least in part in the bushing and operatively coupled to the crank 2180. In the example of FIG. 21, the assembly 2100 provides for line contact between the wastegate shaft and a bore of the bushing. In the example of FIG. 21, the actuator can pull on lever arm L1 such that the lever arm L2 pushes to close the wastegate plug. Such an approach to closing a wastegate can be referred to as a pull-push kinematic.

In FIG. 21, F1 is an actuator force that creates a moment M1 (M1=F1*L1) on the lever 2140 where M1 is transferred to the crank 2180 as force F2 (F2=M1/L2) and where force F3 is acting on the crank 2180 and is equal to the force F2. The force F4 is a reaction force from the bushing, which is carried by the housing, where F4 is the sum of F1 and F2. As shown in the force F4 is opposite the directions of F1 and F2. The aero force and the force F3 are parallel to each other. The forces F1 and F2 act upon the lever 2140 while the force F3 acts upon the crank 2180.

Figure 22:
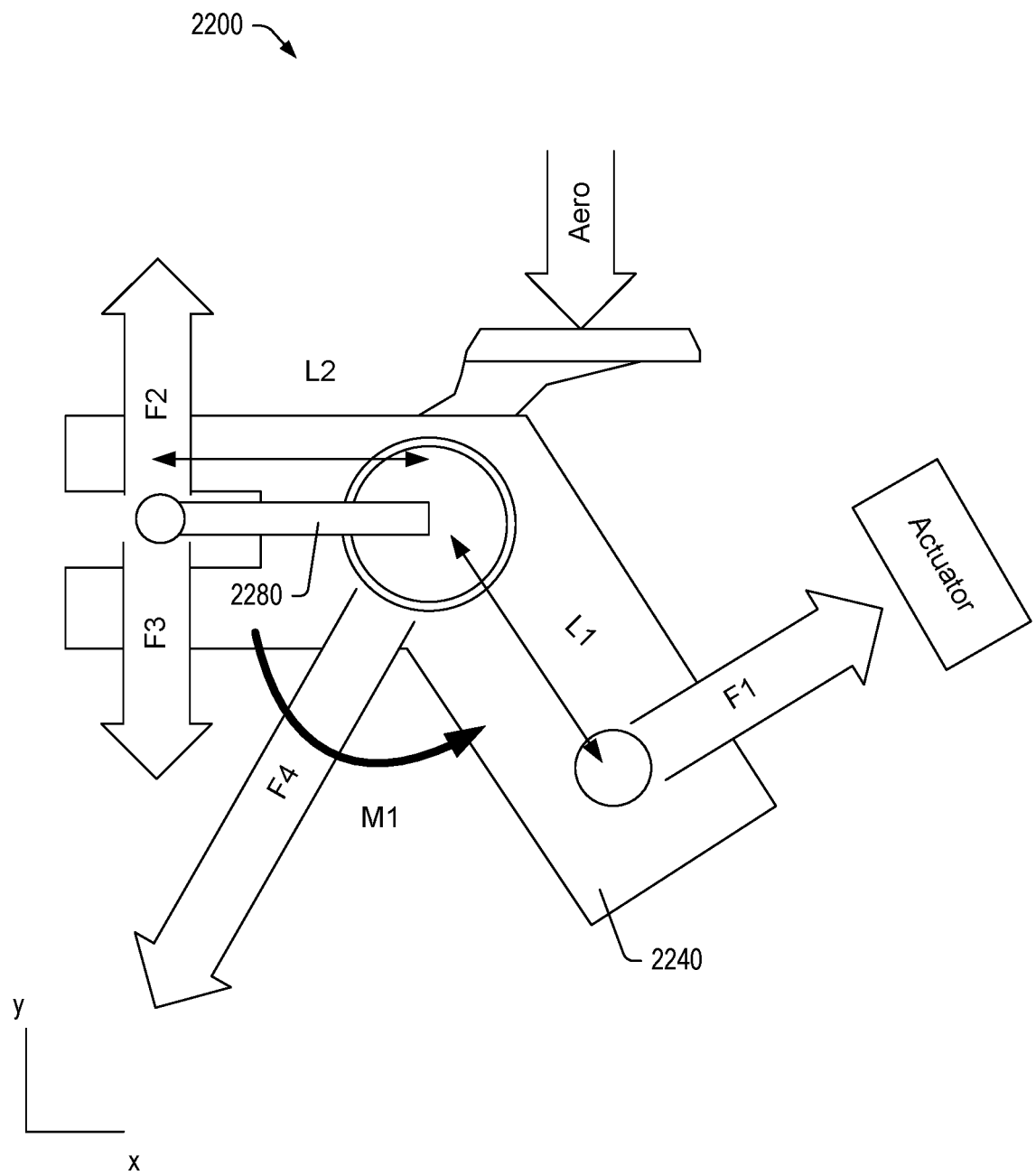
FIG. 22 shows an example of a diagram of an assembly with various forces and dimensions.

FIG. 22 shows a diagrammatic example of an assembly 2200 with various force arrows and dimensions. As shown in FIG. 22, a force F1 is applied as a pulling force by an actuator where a lever 2240 with arms dimensioned L1 and L2 rotates about a bushing and applies a force F4 to the bushing. As shown, a crank 2280 is operatively coupled to the lever 2240 via a pin received in part by a channel of one of the arms of the lever 2240 (e.g., an extension of the lever). The forces F2 and F3 are action/reaction forces between the pin and one wall of the channel of the arm of the lever 2240. Another force arrow shows an aerodynamic force applied to a wastegate plug of a wastegate where the wastegate includes a wastegate shaft disposed at least in part in the bushing and operatively coupled to the crank 2280. In the example of FIG. 22, the assembly 2200 provides for line contact between the wastegate shaft and a bore of the bushing. In the example of FIG. 22, the actuator can pull on lever arm L1 such that the lever arm L2 pushes to close the wastegate plug. Such an approach to closing a wastegate can be referred to as a pull-push kinematic.

In FIG. 22, F1 is an actuator force that creates a moment M1 (M1=F1*L1) on the lever 2240 where M1 is transferred to the crank 2280 as force F2 (F2=M1/L2) and where force F3 is acting on the crank 2280 and is equal to the force F2. The force F4 is a reaction force from the bushing, which is carried by the housing, where F4 is the sum of F1 and F2. As shown in FIG. 22, the force F4 is in a direction that depends on the directions of F1 and F2. The aero force and the force F3 are parallel to each other. The forces F1 and F2 act upon the lever 2240 while the force F3 acts upon the crank 2280. In comparison to the example of FIG. 21, the actuator position is different such that the force F4 is changed, which is a force carried by the bushing and the housing. As an example, a housing may include a rim such that the lever 2240 rotates about the rim of the housing.

As illustrated in FIGS. 21 and 22, the actuator position (e.g., linkage, etc.) can be altered while still providing for line contact of a wastegate shaft and a bushing bore. Such flexibility as to actuator position can be beneficial in an engine compartment, as to turbocharger design (e.g., mounting of an actuator), etc.

In the example of FIG. 22, when compared to the example of FIG. 21, there may be an increase in force to be applied by an actuator. For example, a closing force may increase as the angle between L1 and L2 decreases to be less than 180 degrees or increases to be more than 180 degrees. In other words, there can be a minimum in required applied force at 180 degrees as to the lever arms of the lever 2140.

With reference to the example assemblies 2100 and 2200 of FIGS. 21 and 22, consider the same crank and lever arm lengths to have the same torque and no friction such that four scenarios can exist:

(i) rod force=aero force, no movement of the wastegate;
(ii) rod force>aero force, the wastegate is closing up to its stable point rod force=aero force or it is fully closed and contacting the wastegate seat;
(iii) rod force<aero force, the wastegate is opening, up to its stable point where rod force=aero force; and
(iv) the wastegate is closed and the wastegate plug is contacting the wastegate seat, no movement, so there is equilibrium also as to the rod force being equal to the sum of the aero force and the reaction force from the wastegate seat (e.g., extra force from actuator is transferred to reaction from the wastegate seat in the same direction as aero force).

Consider an example where it is desirable to have the wastegate in a position with 10 mm of actuation stroke that applies 10 N from the actuator to keep it in the desired position. In such an example, if the force applied is 15 N, the wastegate will be moved to an actuator stroke position of 5 mm and stop. In such an example, the aero load is changing and the actuator is in reaction on this and is reducing/increasing force to maintain the desired position. In such an example, there will still be a balance between the actuator force and the aero force.

In the example of FIG. 22, the arms of the lever 2240 dimensioned L1 and L2 can be defined by an arm angle. As an example, an assembly may have a fixed or an adjustable arm angle. For example, a fixed arm angle may be for a particular installation of a turbocharger in an engine compartment where the arm angle provides for a favorable configuration of an actuator and a linkage to the assembly. As to an adjustable arm angle, a lever may be a multi-piece lever where the arm angle may be set, for example, during installation of a turbocharger.

Figure 23:
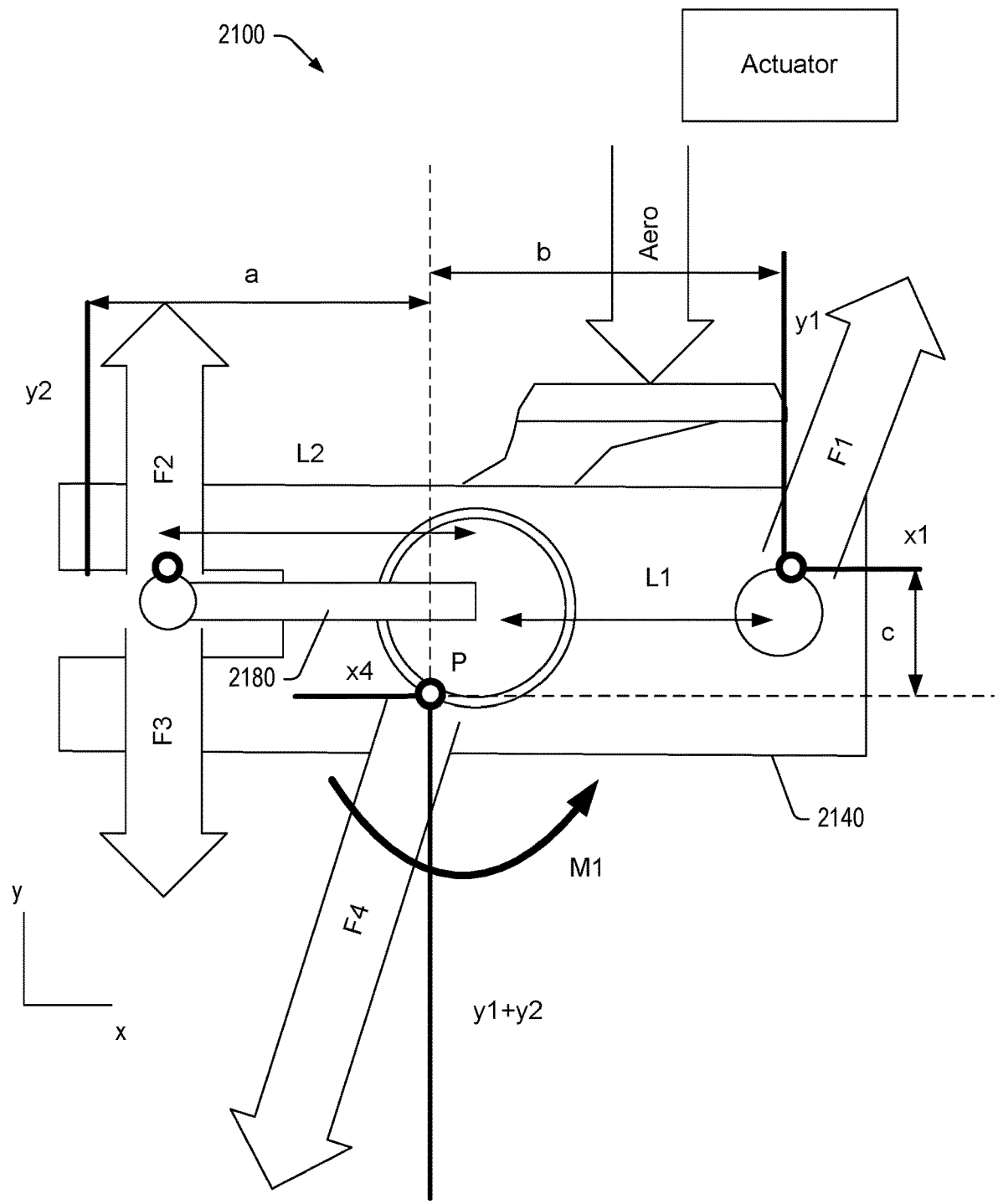
FIG. 23 shows an example of a diagram of the assembly of FIG. 21 with various forces and dimensions.

FIG. 23 shows an example of the assembly 2100 of FIG. 21 with a different angle of the force F1. Various dimensions are shown including: x1, y1, x4, y2, a, b, and c. In the example shown, x1 is to be equal to x4 (assuming no friction) to balance a "translational" force in the x direction; however, since x1 and x4 are applied to openings of the lever 2140 (e.g., perimeter of openings as opposed to axes), they will be not aligned and will thus impart a small rotational force (e.g., in a clockwise direction). That rotational force can be balanced with additional force in the y1 direction. As shown, y2 will likely not be equal y1 because rotational forces are to balance about any point. Using a point labeled as "P", consider clockwise torque equal to (y2*a)+(x1*c) and counter-clockwise torque equal to (y1*b) such that a balance at point P means that: (y2*a)+(x1*c)=(y1*b). For example, consider dimensions of length assigned where y1=b=4, y2=3, a=4, x1=2 and c=2 such that (3*4)+(2*2)= (4*4)=16.

As explained with respect to the example of FIG. 23, y2 (e.g., F2) can be equal and opposite to the force (e.g., F3) applied to the crank 2180 and be in a desired direction that is parallel the aero force (e.g., "Aero") applied to the face of the wastegate plug. The example of FIG. 23 shows that some flexibility exists as to the alignment of a linkage of an actuator as linked to an arm of the lever 2140.

As shown in the example of FIG. 23, y2 (e.g., F2) equals force applied by the crank 2180 to the lever 2140, which applies a counter force (e.g., F3) in a desired direction to resist an aero force on the wastegate. As explained, a compensating force can be in a different direction; however, this can be acceptable because such a force (e.g., F4) can be carried by a bushing and/or a housing rather than the wastegate shaft. As explained, in FIG. 23, in theory, y1 will equal y2 only if the lever arm lengths to their respective pins are the same. If the lever arms are different lengths then y1 and y2 will adjust to balance the rotational torque applied to the lever 2140. As an example, an analysis with respect to dimensions and forces akin to that of FIG. 23 may be applied to one or more other examples of assemblies described herein.

Figure 24:
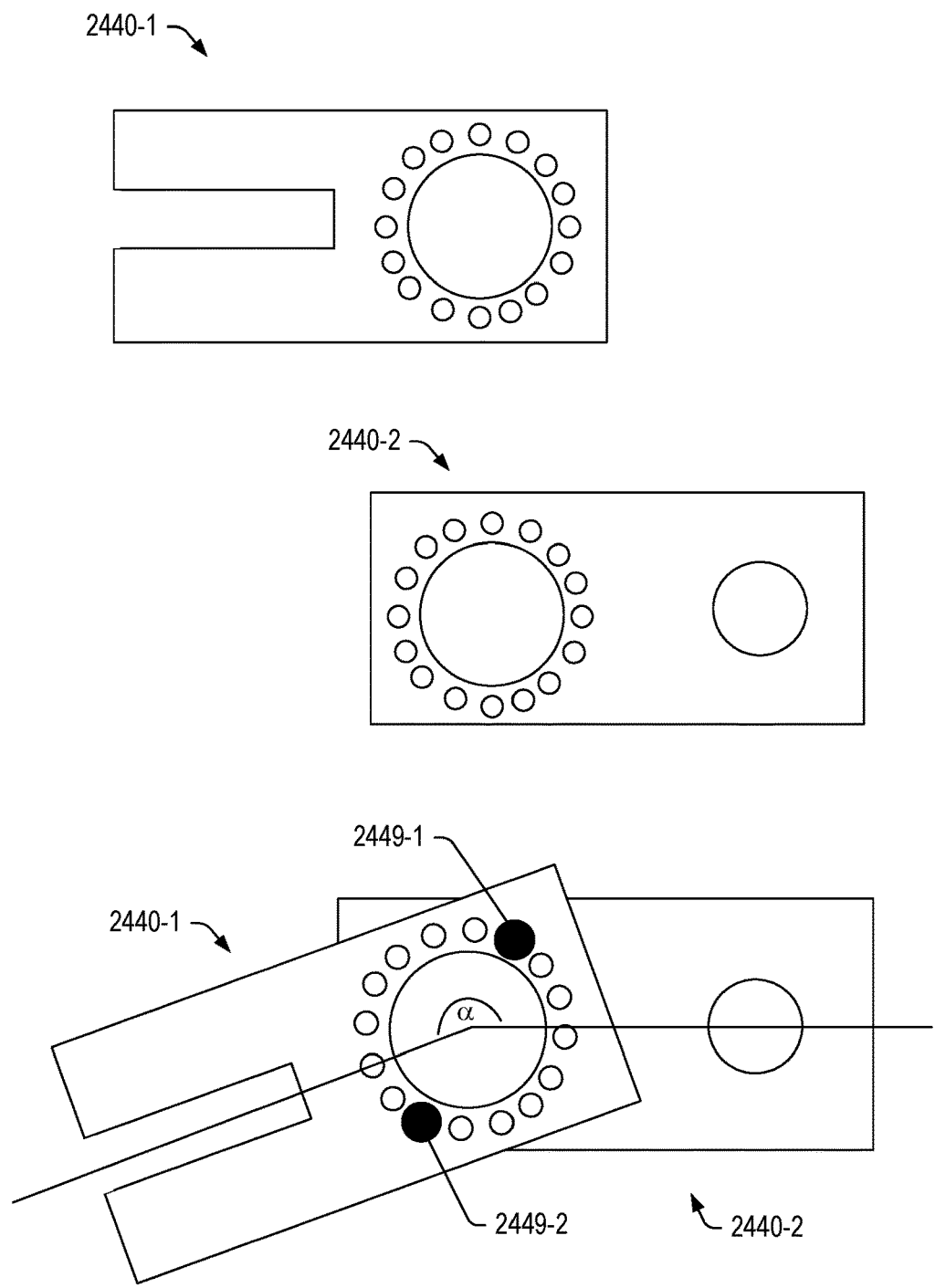
FIG. 24 shows an example of a multi-piece lever that can be part of an assembly.

FIG. 24 shows an example of a multi-piece lever with pieces 2440-1 and 2440-2 where each of the pieces 2440-1 and 2440-2 includes features for setting a desired arm angle, defined as α. As shown, each arm can include a series of openings where a peg or pegs 2349-1 and 2349-2 can be received in pairs of the openings to set a desired arm angle. As an example, the pegs 2449-1 and 2449-2 can be threaded where at least one set of the openings are also threaded (e.g., the piece 2440-2 if on bottom or the piece 2440-1 if on bottom) or, for example, the pegs 2449-1 and 2449-2 may be interference fit and/or welded to set the desired arm angle. In such an approach, an arm angle may be customized to a particular installation. While particular features for adjustment are illustrated in FIG. 24, one or more other features may be utilized. For example, consider a locking ring that can clamp the pieces 2440-1 and 2440-2 while defining an opening for a rim such as a bushing rim or a housing rim. Such a locking ring can include two pieces that act as a clamp, for example, via matching threads (e.g., of a male piece and a female piece). As an example, a locking ring may provide for an unlimited number of arm angles. As an example, a crank may be of a fixed length or may be an adjustable length crank, for example, consider a telescoping crank with a locking mechanism such as a pin, a bolt, etc. As an example, a crank length may be selected from a plurality of different cranks or via an adjustable crank to provide a desired arm length. As an example, a lever can include an adjustable pin to provide a desired arm length. For example, consider the pin 1862 of FIG. 20C being adjustable. In such an example, the extension 1860 of the lever 1860 can include a series of openings where the pin 1862 can be inserted in one of the openings to set a desired arm length.

As an example, one or more pieces may be from a blank (e.g., a blank bar). As an example, one or more pieces may be cast (e.g., from a molten material that can harden upon cooling). As an example, a material of construction of a piece may be a metal. As an example, a material of construction of a piece may be an alloy. As an example, a material (e.g., a metal, an alloy, etc.) may be selected based on operational conditions (e.g., operational conditions of an exhaust gas turbine) and, for example, ability to be welded to another piece. As an example, a unit may be formed of a high temperature metal and/or a high temperature alloy. As an example, a piece may be formed of an alloy such as, for example, a NiCrFe-based alloy (e.g., HASTALLOY™ material, INCONEL™ material, etc.) or another alloy. As an example, a piece may be formed of a stainless steel or another type of steel. As an example, a washer may be made from a material such as a metal, alloy, a ceramic, a composite material, etc. As an example, a washer may be configured as a whole ring or, for example, a split ring such that its diameter may be decreased upon application of force to fit within an opening and where the split ring exerts a force to maintain its position in the opening (e.g., consider a piston ring type of configuration for a split ring washer). As an example, a lever can include a washer seat that can receive a washer. As an example, a bushing or a housing can include a seat that can receive a washer. As an example, a washer may be fit to a lever, a bushing or a housing.

As an example, a turbocharger turbine wastegate assembly can include a lever that includes an opening and two arms, where each of the two arms extends a respective length from the opening; and a crank that includes a wastegate shaft coupling, where the lever and crank are operatively coupled via one of the arms by a pin received in a channel. In such an example, the arms can extend from the opening to form an angle of 180 degrees. As an example, the angle can be an arm angle that is defined by an axis of the opening and an axis of the pin in the channel and by an axis of a pin that operatively couples the lever to a linkage of an actuator. As an example, the arm angle can be defined in an alternative manner by an axis of the wastegate shaft coupling of the crank rather than an axis of the opening where the axis of the wastegate shaft coupling may be displaced from the axis of the opening during operation to provide for line contact between a wastegate shaft coupled to the wastegate shaft coupling and a bore of a bushing disposed in a bore of a turbine housing of a turbocharger.

As an example, a lever can include arms that extend from an opening of the lever to form an angle that is not 180 degrees. For example, consider the lever 1440 of FIG. 14 (an arm angle of the lever 1440 other than 180 degrees) in comparison to the lever 1840 of FIG. 18 (an arm angle of the lever 1840 that is 180 degrees).

As an example, a crank can include a pin and one of two arms of a lever can include a channel (see, e.g., FIGS. 18A and 18B). As an example, a crank can include a channel and one of two arms of a lever can include a pin (see, e.g., FIG. 20D).

As an example, a lever can include two arms where one of the arms operatively couples to a crank and where the other one of the two arms operatively couples to a linkage of a wastegate actuator.

As an example, an assembly can include a bushing where an opening of a lever has a diameter that is greater than a diameter of the bushing (see, e.g., FIG. 20B). As an example, an assembly can include a turbine housing that includes a rim about a bore that can receive a bushing where an opening of a lever has a diameter that is greater than a diameter of the rim (see, e.g., FIG. 20C). As an example, a lever can be rotatable about a bushing (e.g., a rim of a bushing) and/or about a portion of a turbine housing (e.g., a rim of a turbine housing).

As an example, an assembly can include a turbine housing where an opening of a lever has a diameter that is greater than an outer diameter of a bore wall of the turbine housing. In such an example, the bore wall of the turbine housing may be recessed and/or extended in such a manner whereby the opening of the lever can receive a portion of the bore wall, optionally with a washer disposed therebetween. As an example, a washer may be an elongated washer that may include a cylindrical shape, optionally with an L shaped cross-sectional profile, such that a portion of the washer is received in an opening of a lever and another portion of the washer is received about a portion of a bushing or a portion of a bore wall of a turbine housing. In such an example, the portions of the washer may be offset with respect to a longitudinal axis of the washer. Such an approach may provide for positioning of the lever in a plane that differs from a plane of a rim of a bushing, a rim of a turbine housing, etc.

As an example, a lever may be rotatable about an outer diameter of a bore wall of a housing, a lever may be rotatable about an outer diameter of a rim of a housing and/or a lever may be rotatable about an outer diameter of a bushing.

As an example, an assembly can include a washer disposed in an opening of a lever.

As an example, a lever can define a lever plane and a crank can define a crank plane. In such an example, the lever plane can be parallel to the crank plane. As an example, the lever plane and the crank plane can be offset axially with respect to an axis defined by a wastegate shaft coupling of the crank.

As an example, a wastegate shaft coupling of a crank can be or include a clamp.

As an example, a lever can include two arms where one of the two arms is defined by an axis of an opening of the lever and a coupling that operatively couples the lever to a linkage of a wastegate actuator and where the other one of the two arms is defined by the axis of the opening and a pin, which may be a pin received in a channel where the channel can be a channel of a crank and the pin can be a pin of the lever or where the channel can be a channel of the lever and the pin can be a pin of the crank.

As an example, a crank can be resilient in a closed orientation of a wastegate for locking in a dead-point state. For example, FIG. 11 shows the dead-point state 1106 where the linkage 1103 includes a spring that allows for the linkage 1103 to extend a distance along its axis while the plug 1156 is pressed closed and in contact with the wastegate seat 1126. As such, the plug 1156 does not move; rather, the spring allows the linkage 1103 to "stretch" such that the dead-point state 1106 can be achieved where the actuator 1101 may be transitioned to a low power or a no-power state. In the example of FIG. 15, the crank 1480 may be resilient such that a bend can axis between the axes A1 and A3. For example, the crank 1480 may bend in a manner whereby the axis A1 is fixed due to line contact and where the axis A3 moves to reach a dead-point state of an actuator. Such movement may be relatively small (e.g., of the order of millimeters). In such an example, a wastegate plug may be spring-biased via the resiliency of the crank 1480.

Although some examples of methods, devices, systems, arrangements, etc., have been illustrated in the accompanying Drawings and described in the foregoing Detailed Description, it will be understood that the example embodiments disclosed are not limiting, but are capable of numerous rearrangements, modifications and substitutions.

What is claimed is:

1. A turbocharger turbine wastegate assembly comprising:
   a wastegate shaft that comprises a rotational axis;
   a lever that comprises an opening and two arms, wherein each of the two arms extends a respective length from the opening and wherein the opening is centered about the rotational axis of the wastegate shaft; and
   a crank that comprises a wastegate shaft coupling operatively coupled to the wastegate shaft, wherein the lever and crank are operatively coupled via one of the arms by a pin received in a channel, wherein rotation of the lever about the rotational axis of the wastegate shaft causes, via the crank, rotation of the wastegate shaft coupling to rotate the wastegate shaft.

2. The turbocharger turbine wastegate assembly of claim 1 wherein the arms extend from the opening to form an angle of 180 degrees.

3. The turbocharger turbine wastegate assembly of claim 1 wherein the arms extend from the opening to form an angle that is not 180 degrees.

4. The turbocharger turbine wastegate assembly of claim 1 wherein the crank comprises the pin and one of the arms of the lever comprises the channel.

5. The turbocharger turbine wastegate assembly of claim 1 wherein the crank comprises the channel and one of the arms of the lever carries the pin.

6. The turbocharger turbine wastegate assembly of claim 1 wherein the other one of the arms is operatively coupled to a linkage of a wastegate actuator.

7. The turbocharger turbine wastegate assembly of claim 1 comprising a bushing wherein the opening comprises a diameter that is greater than a diameter of the bushing.

8. The turbocharger turbine wastegate assembly of claim 7 wherein the lever is rotatable about the bushing.

9. The turbocharger turbine wastegate assembly of claim 1 comprising a washer disposed in the opening.

10. The turbocharger turbine wastegate assembly of claim 1 wherein the lever defines a lever plane and wherein the crank defines a crank plane.

11. The turbocharger turbine wastegate assembly of claim 10 wherein the lever plane is parallel to the crank plane.

12. The turbocharger turbine wastegate assembly of claim 11 wherein the lever plane and the crank plane are offset axially with respect to an axis defined by the wastegate shaft coupling of the crank, wherein the axis is aligned with the rotational axis of the wastegate shaft.

13. The turbocharger turbine wastegate assembly of claim 1 wherein the wastegate shaft coupling of the crank comprises a clamp.

14. The turbocharger turbine wastegate assembly of claim 1 wherein one of the two arms is defined by an axis of the opening and a coupling that operatively couples the lever to a linkage of a wastegate actuator and the other one of the two arms is defined by the axis of the opening and the pin, wherein the axis of the opening is aligned with the rotational axis of the wastegate shaft.

15. The turbocharger turbine wastegate assembly of claim 1 wherein the crank is resilient to act as a spring member in a closed orientation of a wastegate for locking in a dead-point state.

* * * * *